United States Patent [19]

Bloy

[11] Patent Number: 4,741,039
[45] Date of Patent: Apr. 26, 1988

[54] SYSTEM FOR MAXIMUM EFFICIENT TRANSFER OF MODULATED ENERGY

[75] Inventor: Graham P. Bloy, Bangkok, Thailand
[73] Assignee: Metme Corporation, St. Louis, Mo.
[21] Appl. No.: 364,931
[22] PCT Filed: Jan. 26, 1982
[86] PCT No.: PCT/US82/00102
 § 371 Date: Jan. 26, 1982
 § 102(e) Date: Jan. 26, 1982
[87] PCT Pub. No.: WO83/02700
 PCT Pub. Date: Aug. 4, 1983
[51] Int. Cl.[4] .............................................. H04B 1/66
[52] U.S. Cl. ....................................... 381/98; 381/106
[58] Field of Search ................ 328/168, 171; 330/126, 330/133; 333/14; 381/77, 80, 94, 98, 103, 104, 106

[56] References Cited

U.S. PATENT DOCUMENTS

| | | | |
|---|---|---|---|
| 3,729,693 | 4/1973 | Dolby | 333/14 |
| 3,795,876 | 3/1974 | Takahashi et al. | 333/14 |
| 4,025,723 | 5/1977 | Blackledge . | |
| 4,061,874 | 12/1977 | Fricke et al. . | |
| 4,249,042 | 2/1981 | Orban . | |
| 4,368,435 | 1/1983 | Bloy | 330/133 |
| 4,457,014 | 6/1984 | Bloy | 381/98 |

Primary Examiner—Jin F. Ng
Assistant Examiner—Randall P. Myers
Attorney, Agent, or Firm—Kalish & Gilster

[57] ABSTRACT

A signal processing system is disclosed for processing dynamically varying intelligence-carrying signals represented by different frequencies by transferring these signals within a pass band narrower than the range of the frequencies. The system, although not a compressor or compandor system, makes use of a compressor circuit for compressing only signals within a predefined pass band. Active filter circuits shape the compressed signals into a predetermined power envelope having fundamental frequency signal components and harmonically related constituents of the fundamental frequencies. Another compressor circuit is used for further compressing signal constituents of the power envelope. A negative feedback arrangement provides dynamic limiting of compression by the first compressor circuit as a function of increase of compression by the second compressor circuit. A combiner is used to recombine the harmonically related constituents delivered by the second compressor circuit, and thus retrieve the dynamically varying intelligence-carrying signals. Thus, the system involves a new method of signal processing involving first defining a range of original signal constituents to be processed including signal fundamentals and harmonically-related components of said fundamentals and then primarily dynamically compressing the range of original signal constituents. Signal component amplitudes of the dynamically compressed signal are selectively controlled to define a power envelope which is further dynamically compressed to provide processed signal constituents, but while providing time-delayed limiting of compressing of the original signal constituents to permit dynamic variation of the processed signal constituents. The processed signal constituents are recombined to reproduce the intelligence-carrying signals, recovering original frequencies quite beyond the pass band.

8 Claims, 12 Drawing Sheets

PRIMARY ACTIVE FREQUENCY CONTROL

BANDPASS INPUT FILTER

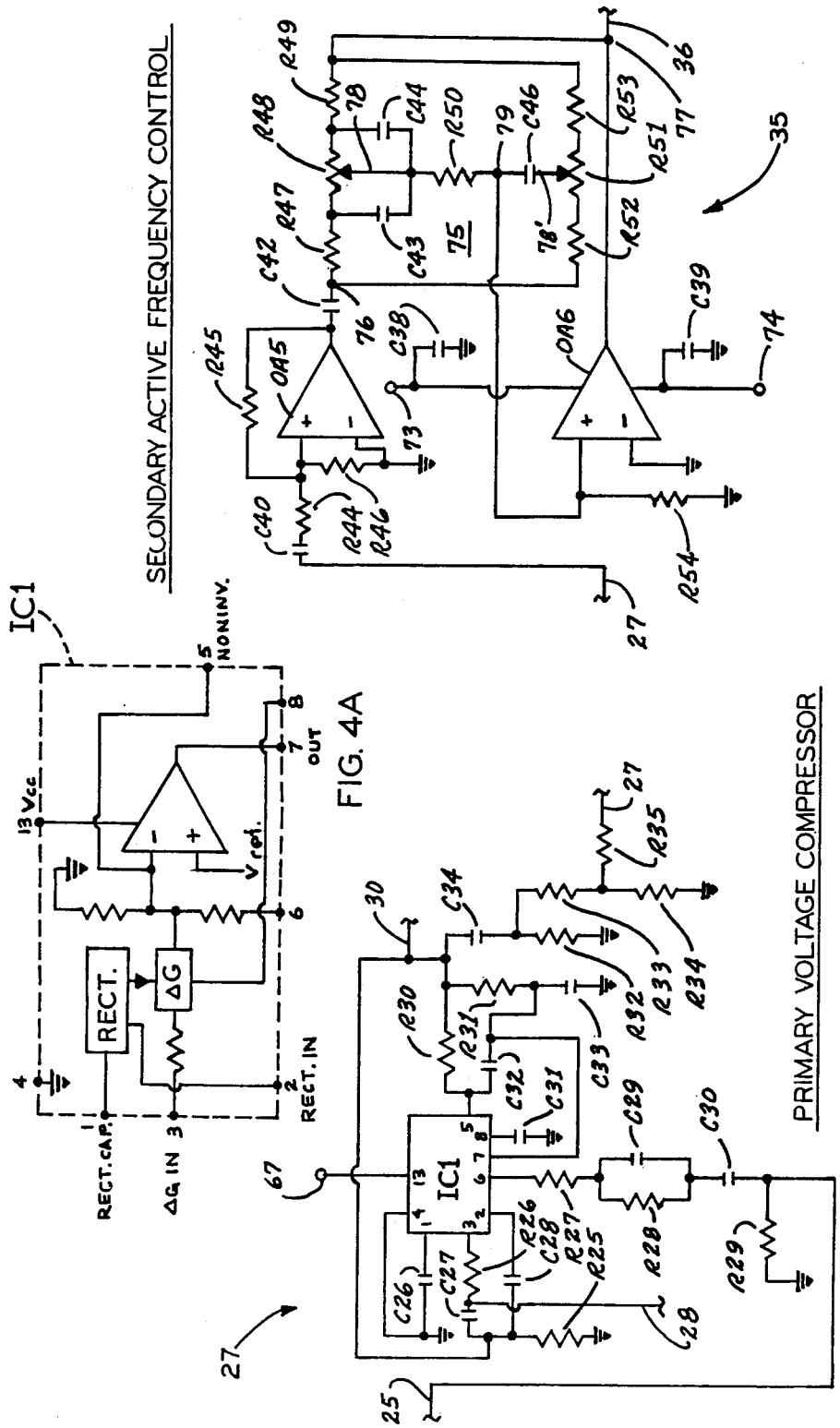

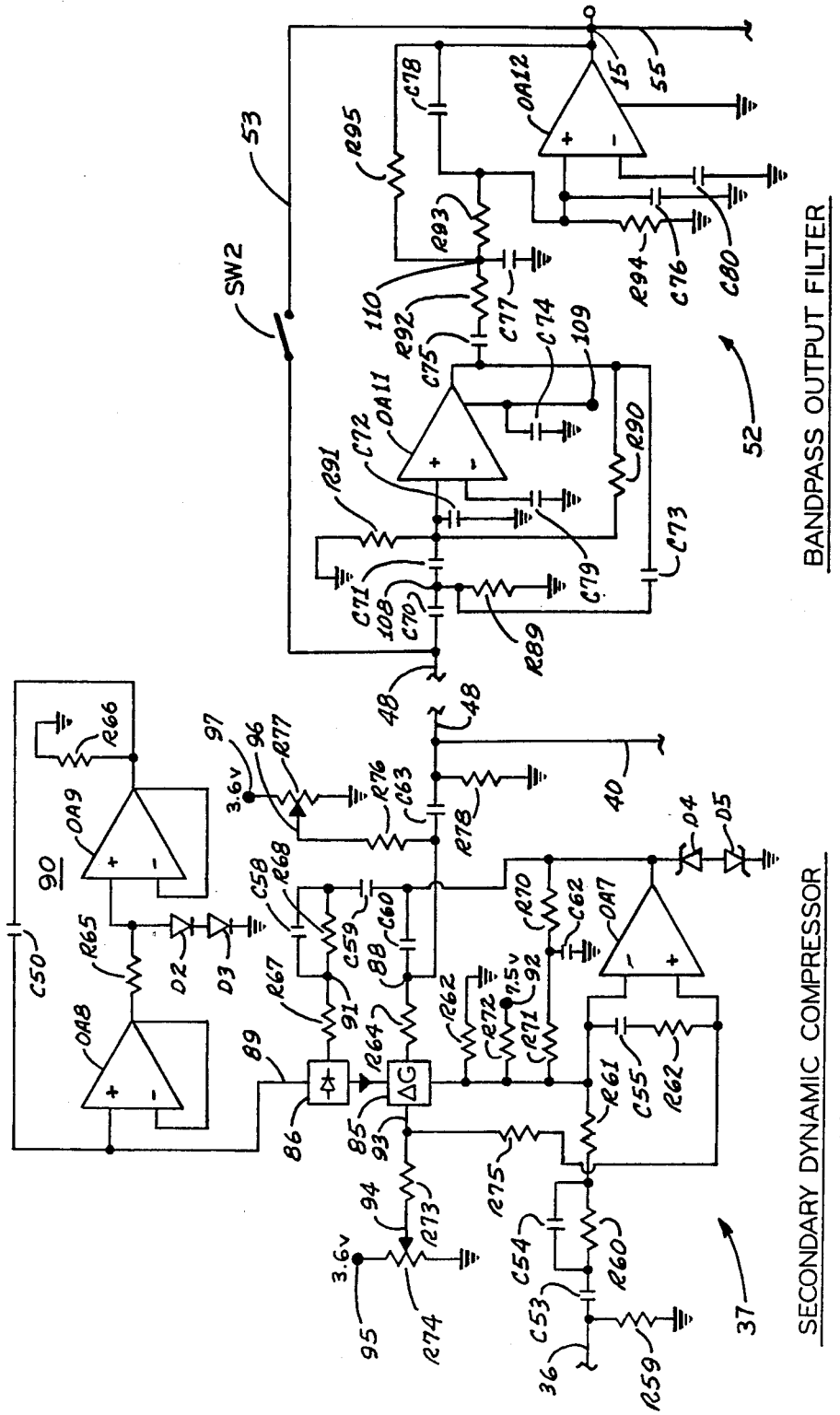
FIG. 7 BANDPASS OUTPUT FILTER
FIG. 6 SECONDARY DYNAMIC COMPRESSOR

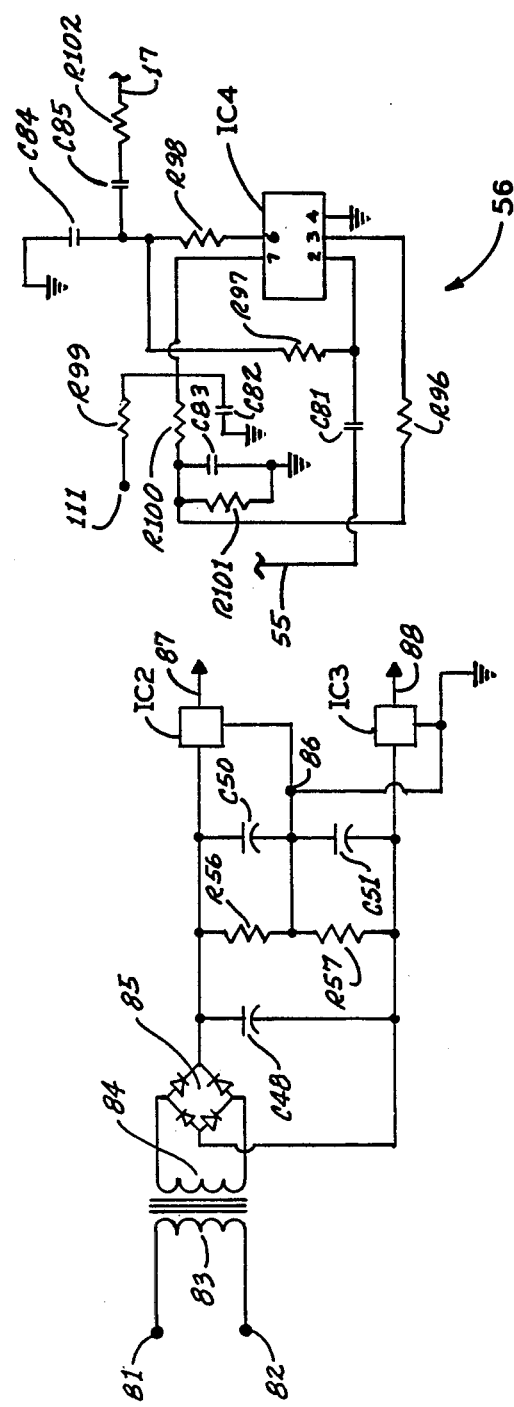
FIG. 11 AF AMPLIFIER
FIG. 10 ACTIVE FILTER POWER SUPPLY

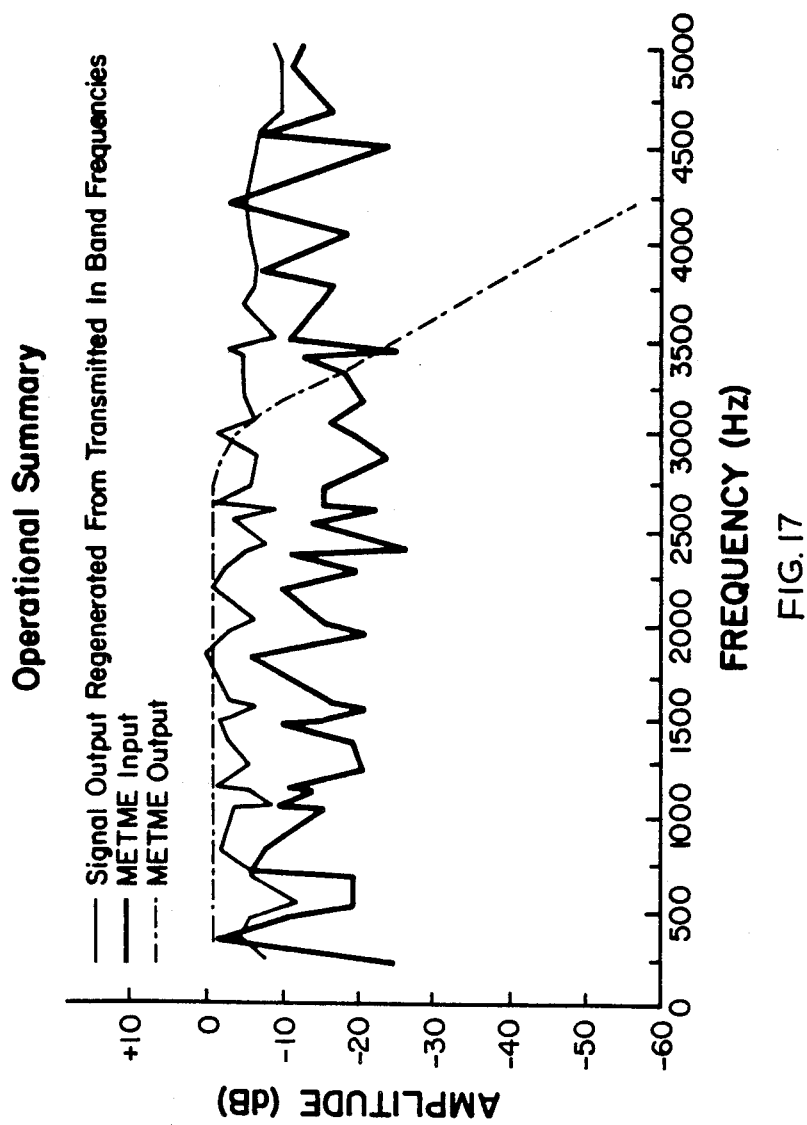

SYSTEM FOR MAXIMUM EFFICIENT TRANSFER OF MODULATED ENERGY

CROSS-REFERENCE TO RELATED APPLICATION

This application is based upon International Application No. PCT/US82/00102. The present invention is an improvement of the signal processing systems disclosed in co-assigned U.S. Pat. No. 4,368,435 (corresponding to PCT Pub. No. WO82/01290 based upon International Application PCT/US80/01331) and co-assigned U.S. Pat. No. 4,457,014 (corresponding to PCT Pub. No. WO83/00787 based upon International Application PCT/US81/01147).

BACKGROUND OF THE INVENTION

The present invention relates to signal processing and modulation systems and, more particularly, to an improved signal processing system intended for maximizing the efficiency of transfer signals of various frequencies for enhancing signal intelligibility and clarity while avoiding loss of dynamics. The invention has applicability for processing of audio and higher frequency signals transmitted by various transmission modes, such as by radio, TV, and by line systems.

With regard to the transmission of intelligence-carrying signals, including modulating electromagnetic radiation in accordance with a modulating signal (such as audio modulation of a radio frequency signal), there has always been a problem of loss of attenuation of intelligence which is attempted to be transferred within a given frequency band where the frequency band over which intelligence must be transferred is narrower than the range of frequencies which normally convey such intelligence. Thus, when the band width or deviation of a radio frequency signal is narrow, the full spectrum of speech and other audio signals has been heretofore limited. It has, therefore, been general practice merely to transfer only a portion of those frequencies of the audio spectrum with consequent loss of intelligibility, voice character, dynamics, clarity and fidelity in general.

In the line and radio frequency transmission and reception of modulated signals a major problem has always been to obtain a high level of dynamic amplitude while retaining a usable portion of the full spectrum of speech frequencies, while keeping the band width of the transmitted radio signals as narrow as possible.

Relative to transmission of voice signals by modulation of radio frequency signals, attributes of human speech of concern are dynamic amplitude and harmonic relationship. The latter is extremely important in identification intelligibility. Dynamic amplitude can be defined as the varying level of audio received by a modulation stage in any mode of modulation. The human voice is made up by a complex structure of harmonics, the main bands of harmonics falling within a 3 kHz band width. A speech band pass frequency commonly selected is 300 Hz to 3,000 Hz, and all other harmonics are generally suppressed. However, these out-of-bands harmonics define voice character and, thus, intelligibility. But the suppressed harmonics fall in such a wide spectrum that if the entire speech harmonic make-up were to be transmitted, a transmission band width of some 15 kHz would be required. With modern narrow band voice transmission systems, this would become impossible.

There are many modes of radio and line transmission using audio or other signal modulation where these matters are of great concern. Principle forms of modulation presently in use are AM, SSB and FM.

SUMMARY OF THE INVENTION

An object of the invention is, in general, to transfer, within a given frequency band, intelligence-carrying signals in such a way that intelligence normally conveyed by signals of frequencies beyond the given frequency band is instead conveyed by signals within such frequency bands, thereby to transfer intelligence otherwise lost or attenuated.

An object of the invention is to provide a system for maximizing the efficiency of transfer of signals of various frequencies, such as modulated audio frequency energy.

A further object of the invention is to provide such a system useful with modulation systems.

A further object of the invention is to provide such a system for providing transfer of modulated signals in such a way that high average modulation power is attainable.

A still further object of the invention is to provide such a system for providing transfer of signals to enhance signal intelligibility and clarity while preventing loss of dynamics.

Another object of the invention is to provide such a system which allows the processing of signals demodulated from received RF signals in order to retrieve signals with effectively high signal-to-noise ratios even where there is high noise level associated with the received RF signals.

A further object of the invention is to provide such a system which can be utilized for processing of signals either prior to their use in modulating a transmitted RF signal, or for processing demodulated signals upon reception of the transmitted RF signal, or both.

An additional object of the invention is the provision of such a system which is useful with various modulation systems and modulation stages to achieve maximum carrier utilization, with resulting increase in effective transmitted power and clarity.

It is also an object of the invention to provide such a system which has both processing circuitry and method aspects.

Another object of the invention is the provision of such a system which processes signals in such a way as to reconstitute wide frequency spectrum dyanmics associated with signals to be processed (e.g., voice signals used).

Another object of the invention is the provision of such a system which reconstitutes signals otherwise lost by recovery and application of harmonics to audible levels of certain harmonics otherwise suppressed or filtered.

A further object of the invention is the provision of such a system permitting transmission of signals with high average modulation levels, approaching 100% average modulation, without customary dramatic loss of dynamics and intelligibility.

An object of the invention also is the provision of such a system which can be utilized in the fields of RF transmission of speech, audio signals generally, and other intelligence-carrying signals such as high speed tone encoded data, teletype, facsimile, and other modes of data communication, and which, when utilized as part of a data communication link, reduces data dropout.

It is also an object of the invention to provide such a system which not only is relatively simple and utilizes integrated, compact circuit components but also uses a minimum number of control elements setable to the application at hand without need for further adjustment.

A related further object of the invention is the provision of such a system utilizing various visual indicators for keeping the user constantly informed and aware of the extent to which signals are properly processed through the system.

An additional object of the invention is the provision of such a system which can accept substantially any low level audio frequency signal while according to the user the options of utilizing and emphasizing various components of the audio spectrum, and of selectively utilizing filtering of the input and/or output signals.

Another object of the invention is the provision of such a system in which the output of signals processed through the system can be preset in amplitude to be fed to any modulation stage currently used in conventional communication systems.

A further object of the invention is the provision of such a system which is especially of advantage in connection with narrow band VHF and VHF transmission, such as in voice, television, and data communications and in satellite-relayed RF transmission systems, and making possible extraordinary narrow band transmission containing full dynamic characteristics of signals so processed while maintaining high modulation levels.

Among other objects of the invention may be noted the provision of such a system which can be utilized in connection with AM, FM, TV, SSB, PAM, FSK (frequency shift keying) and tone activated TTY transmissions, which also can be utilized in public address application and music amplification systems.

Finally, among still other objects of the invention may be noted the provision of such a system which allows individual tailoring of harmonic response curves depending upon natural frequencies of signals to be processed; while allows continuous gain control; which achieves linear tracking during processing; which operates to eliminate or greatly reduce third harmonic distortion; which operates to reconstitute out-of-band dynamics for allowing them to be transmitted on a narrow band signal; which makes use of solid state integrated circuit technology; which is essentially uncomplicated as well as being simple to use and maintain; which can advantageously be operated from a low voltage or battery power supplies; and which exhibits low proper consumption and inherent high efficiency during operation.

Other objects and features will be in part apparent and in part pointed out hereinbelow.

Briefly, a signal processing system of the invention includes circuitry by which signals to be processed are supplied to a bandpass input filter and, thus filtered, to a primary active frequency control. The output of the latter drives a primary voltage compressor which selectively limits signal dynamics to a predetermined window, being controllably preset and driven with different bands of amplitude of the processed signal spectrum determined by the primary frequency control to maximum compression levels. The output of the compressor is presented to a secondary active frequency control which drives a secondary dynamic compressor with different bands of frequencies. An automatic gain control tied to the latter compressor supplies time-delayed feedback to the primary voltage compressor to achieve overall dynamic response. The processed output of the secondary compressor is provided to a bandpass output filter and, sharply attenuated by the latter, is delivered for further use.

BRIEF DESCRIPTION OF THE DRAWINGS

FIG. 4 is a schematic circuit diagram of a primary voltage compressor of the system of FIG. 1.

FIG. 4A is a block diagram of an integrated circuit device forming part of the primary compressor of FIG. 4.

FIG. 5 is a schematic circuit diagram of a secondary active frequency control of the system of FIG. 1.

FIG. 6 is a schematic circuit diagram of a secondary dynamic compressor of the system of FIG. 1.

FIG. 7 is a schematic circuit diagram of a bandpass output filter of the system of FIG. 1.

FIG. 10 is a schematic circuit diagram of an active filter power supply utilized in the system of FIG. 1.

FIG. 11 is a circuit schematic diagram of an audio frequency amplifier utilized in the system of FIG. 1.

FIG. 17 is an operational summary in the form of a graph on which are continuously plotted the amplitude versus frequency of system input signals, output signals and regenerated signal output resulting from transmitted in-band frequencies.

Corresponding reference characters indicate corresponding parts throughout the several views of the drawings.

DESCRIPTION OF THE PREFERRED EMBODIMENT

General Description of the System

Figure 1:
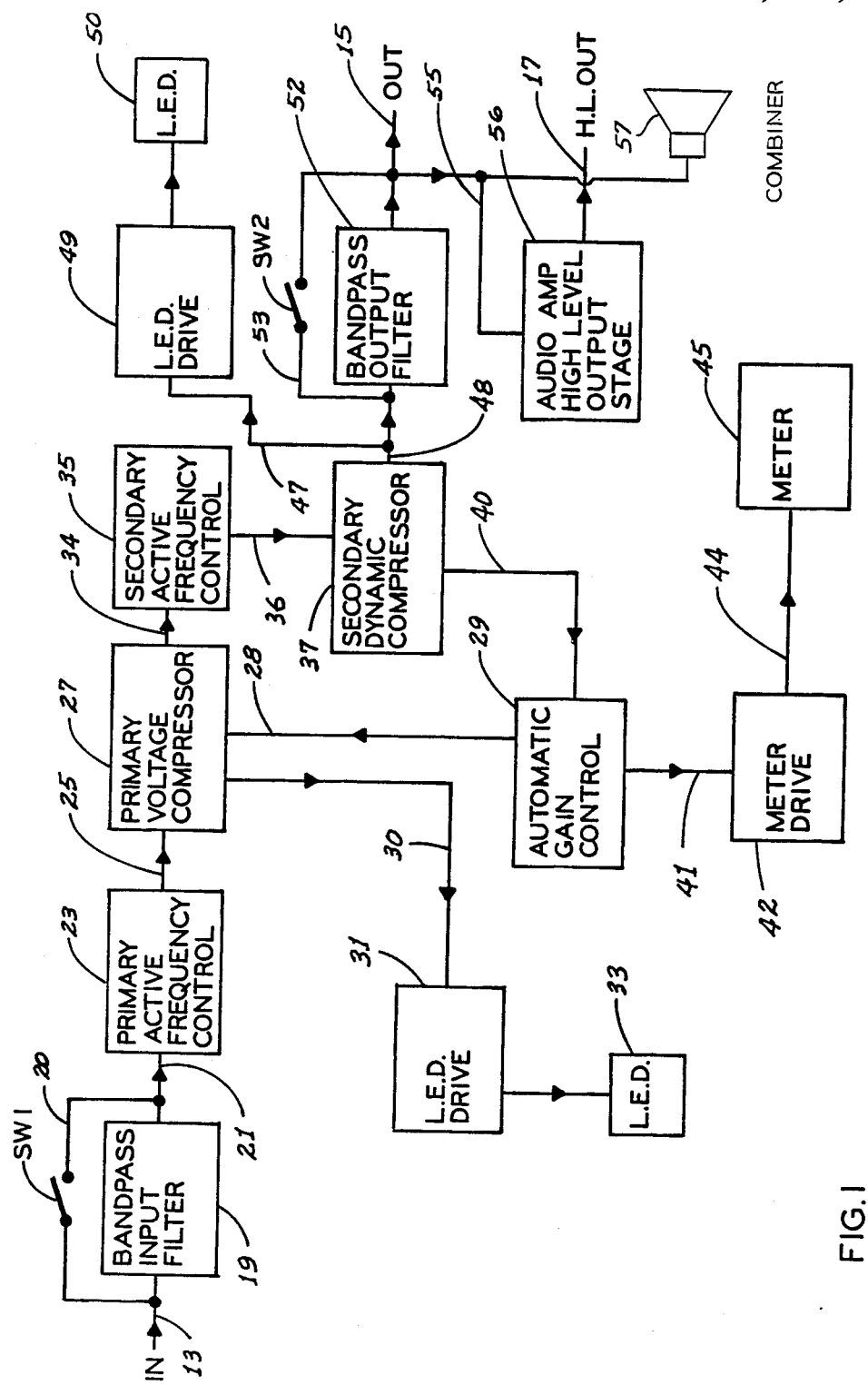
FIG. 1 is a block diagram of a system constructed in accordance with and embodying the present invention.

Referring now to the drawings and particularly to FIG. 1, the overall relationship of various circuits of a system of the invention are shown in block diagrammatic form.

Signals to be processed by the system, such as speech or other audio frequency signals, are delivered to an input at 13 from any of myriad possible sources, such as the output of a microphone, preamplifier, an intermediate amplification stage in a modulation system, or tape recorders, the output of an intermediate frequency stage of an RF transmitter, receiver, etc. Although the input signals typically may consist of tone pulses, frequency shift keying pulses, tone encoded information, teletype signals (TTY), facsimile, data signals, and voice transmissions, and other tone-related or audio signals. They may also be of radio frequencies, e.g., above audio frequencies and including wavelengths to and beyond the submillimeter range. The signals, after being processed through circuitry of the system, are delivered for further use by an output 15.

An auxiliary output 17 is provided for presenting output signals of high levels. Output signals delivered by output 15 are utilized for purposes such as the driving of a modulator, for delivery to an audio amplification stage, further audio or radio frequency processing or various purposes such as amplification, recording, decoding, retransmission, frequency conversion, and so forth. The high level output provided by output 17 may be utilized for driving various recording devices, such as oscilloscopes, spectrum analyzers, and the like, without limitation.

Although the system is advantageous for processing audio frequency information containing voice content or speech, tones and tonal data of various types of an audio frequency, as alluded to above, signals carrying other types of intelligence may be processed advantageously by the invention. Thus, it is to be understood that the system of the present invention is utilized for transferring signals of whatever frequency in such a way that the efficiency of transfer is maximized or optimized by processing the signals for various purposes such as, for example, to provide high average modulation power, to enhance signal intelligibility, to provide high clarity of signal transmission, to avoid loss of dynamics, and to improve signal-to-noise (S/N) ratios, to achieve transmission of information within a given frequency window and otherwise to attain the stated objects. Such processing is carried out in such a way that intelligence normally carried on signals having frequencies outside a given pass band is nevertheless transferred within the pass band by being carried on other in-band frequencies which are subsequently recombined to provide the original frequencies and recover the otherwise lost or attenuated intelligence.

Input 13 delivers signals to a bandpass input filter (BIF) 19 for providing filtering of frequencies to achieve a pass band of, for example, between 30 Hz and 3 kHz, being thus substantially less than the lower and upper limits of frequency components, including harmonics, characteristic of human speech, which may extend several kilohertz above the 3 kHz band limit. Filter 19 effectively limits all other frequencies. The substantially 3 kHz pass band thus achieved is merely illustrative and that preferred and utilized for voice signal processing by the new system. The pass band may be varied in accordance with the purpose intended for the present system, e.g., in having different widths and different lower and upper frequency limits, including audio through RF frequencies. A switch SW1 connected by a circuit lead 20 between output 13 and the output 21 of filter 18 permits selective disablement of filter 19 for purposes noted hereinbelow.

The output of the bandpass is delivered by output connection 21 to a primary active frequency control (PAFC) 23. Control 23 effectively splits the audio spectrum of the signals delivered to it into two separate frequency subbands. Preferably, although not necessarily, the lower band is from 250 Hz to 1.2 kHz and the upper frequency band is from 1.4 kHz to 3.5 kHz. PAFC 23 includes means for selectively controlling the amplitude of the audio content of each of these audio bands allowing the user either to attenuate or to provide gain in each of the sub-bands over a preferred range of ±10 db. Also, the primary active frequency control 23 preferably incorporates an input gain control for purposes later appearing. The control components of PAFC 23 also allow individual tailoring of out-of-band harmonics which are to be reconstituted by processing of audio signals by the system. Although two sub-bands are provided and controlled by control 23 for speech processing, a greater number may be used for processing other types of signals.

Signals from control 23 are then provided by a connection 25 to a primary voltage compressor (PVC) 27. The latter provides a relatively high compression range, e.g., preferably 135 db, as well as pre-emphasis of high frequency audio components to compensate for high frequency losses which otherwise could occur during processing. Compressor 27 is preferably selected to limit all signal dynamics to a 27 db window with a tracking error of not greater than about ±3 db. Included within compressor 27 is a variable gain cell which is indirectly controlled, via a lead 28, by an automatic gain control (AGC) circuit 29 described hereinbelow.

Also connected with compressor 27 by a lead 30 is an LED drive circuit 31 for driving an LED indicator 33 in accordance with the operation of compressor 27 to provide the system operator with an indication of the extent to which maximum usable compression is being provided by compressor 27.

The output of compressor 27 is delivered to a secondary active frequency control (SAFC) 35. It splits the now dynamically compressed audio signals into two further frequency sub-bands, a lower frequency sub-band of preferably from about 300 Hz to 1.5 kHz and an upper frequency sub-band of preferably from about 1.5 kHz to 3 kHz. Like the first set of sub-bands determined by PAFC 23, the second set of sub-bands determined by SAFC 35 each involve frequency ranges substantially less than the principal pass band.

SAFC 35 is adapted for providing gain and attenuation control within these two sub-bands variable over a range of preferably ±12 db. For this purpose, manual control means may be used to selectively determine the gain or attenuation within each frequency band, or may be preset for dedicated applications. If desired, more than two frequency sub-bands may be provided by control 35 dependent upon the type of signals to be processed, whereas two are sufficient for processing of speech frequencies.

Unlike PAFC 23, SAFC 35 is adapted for providing gain peaking and attenuation occurring about sub-band center frequencies with the respective lower and upper bands at preferably 1 kHz and 2.4 kHz. This feature allows SAFC 35 to selectively disregard interacting, and possibly distortion-productive harmonics occurring within the input pass band established by BIF 19.

The output of frequency control 35 is fed to a secondary dynamic compressor (SDC) 37. The circuitry of SDC 37 is intended to provide an extremely fast tracking system with extremely low tracking distortion (preferably less than about 0.1%) and to accept and provide compression of signals having a dynamic amplitude range of up to about 120 db while achieving a compression window of preferably only 50 db, yet to provide a third harmonic distortion (THD) figure of less than preferably 1%. AGC circuit 29 is interconnected with circuit components of SDC 37 by a connection 40 to provide an input for AGC circuit 29 which in turn controls PVC 27 by circuit connection 28, thereby providing a negative AGC feedback loop for limiting the degree of primary voltage compression provided by PVC 27 as a time-delayed function of compression by SDC 37 as explained below. However, the connection of AGC circuit 29 to SDC 37 provides to PVC 27 a d.c. reference signal derived from compression stages of SDC 37.

In effect, AGC circuit 29 by interconnection with SDC 37 amplifies a tracking voltage output of SDC 37 and delivers a voltage varying within preset parameters to a variable gain cell of PVC 27 as a function of this tracking voltage. This is carried out for the purpose of achieving extremely high tracking stability and for limiting third harmonic distortion while reconstituting through voltage gain via SAFC 35 the original signal dynamics fed to SDC 37. However, reconstituting of otherwise lost signal dynamics occurs as well in other portions of the system circuitry.

Interconnected as indicated at 41 with AGC circuit 29 is a meter drive circuit 43 for driving, as indicated at 44, a meter 45 preferably of a moving coil type to provide averaging and serving as a visual indicator for displaying not only the compressed output voltage provided by SDC 37 but also average peak dynamic compression, and thus indicating the extent to which the overall capability of the system is being utilized. Other types of indicators may be used for processing of signals other than of audio frequencies.

Interconnected as indicated at 47 with the output 48 of secondary dynamic compressor 37 is an LED drive circuit 49 for driving an LED indicator 50 to indicate the degree of compression being achieved by SDC 37. Its output is delivered to a bandpass output filter (BOF) 52 for providing sharply attenuated bandpass speech signals, BOF 52 has preferably a pass band of between 300 Hz and 3 kHz with very sharp roll-off or corners at the edges of the pass band to limit the processed audio between these upper and lower limits. The pass band limits here noted are those suitable for narrow band HF, VHF and VHF transmission by FM, AM and SSB modes, and narrower or wider limits may be selected for other purposes.

BOF 52 preferably provides unity gain and has an extremely low noise figure to avoid introducing further noise into the now processed signals. If desired, the filtered signals provided at output 15 may be attenuated to provide signal levels suitable for other systems being driven by the present system, but whether directly, or indirectly are delivered to a speaker 57 or other recombining device. In a circuit 53 connected around BOF 52 is a switch SW2 for selectively disabling the operation of BOF 52 for purposes noted hereinbelow. The output of BOF 52 is also provided, at 55, to an audio amplifier 56 constituting a high level output stage and providing output 17.

The following detailed description of circuitry illustrates discrete analog design of the system for processing of human speech signals.

DETAILED DESCRIPTION OF CIRCUITRY OF THE SYSTEM

Now that the general circuitry of the system has been described, the specific circuitry of each of the blocks designated in FIG. 1 is described hereinbelow.

In the interest of clarity, not all of the various conventional power supply or similar connections are necessarily illustrated. In some cases, discrete integrated circuits as well as discrete components are utilized. But, it should be understood that some or all of the circuit devices of discrete commercial types such as those described may be replaced by circuitry involving large scale integration (LSI) or very large scale integration (VLSI). Also, certain analog processing circuitry may be supplemented, augmented, etc. by digital processing circuitry.

Additionally, it is noted that in describing a preferred embodiment, specific terminology is utilized for the sake of clarity. However, it is not intended to limit to the specific terms so selected and hence it is to be understood that each specific term includes all technical equivalents which operate in a similar or functionally homologous or synonymous manner to accomplish a similar or equivalent purpose. For example, the term "interconnected" or "connected" is not limited to a meaning of directly connected but rather includes indirect connection or connection through intervening components. Also, the term "series" or various expressions such as "series circuit", "series-connected", and the like are all to be construed as describing only the generalized attribute of a circuit path, branch, or network, rather than to mean that the same current necessarily must pass through each element so described. Accordingly, if terminals of the plurality of the elements of the present circuitry form a path between two circuit nodes, they may for convenience of reference be said to be in series even though other elements may have a connection to intermediate nodes of such path.

In the implementation of the invention, the circuit blocks may individually or in combination be assembled on printed circuit boards (PCB's) of standard size, if desired, and may be assembled in cabinetry. The various modules and blocks of FIG. 1 may be provided separately or in a combination on PCB's of the type having an arrangement of contacts along an edge for being mated to a so-called "mother" board or mainframe.

Generally speaking, interconnections between the individual circuitry described in FIGS. 2-11 are indicated by the alignment of leads.

Figures 2, 3:
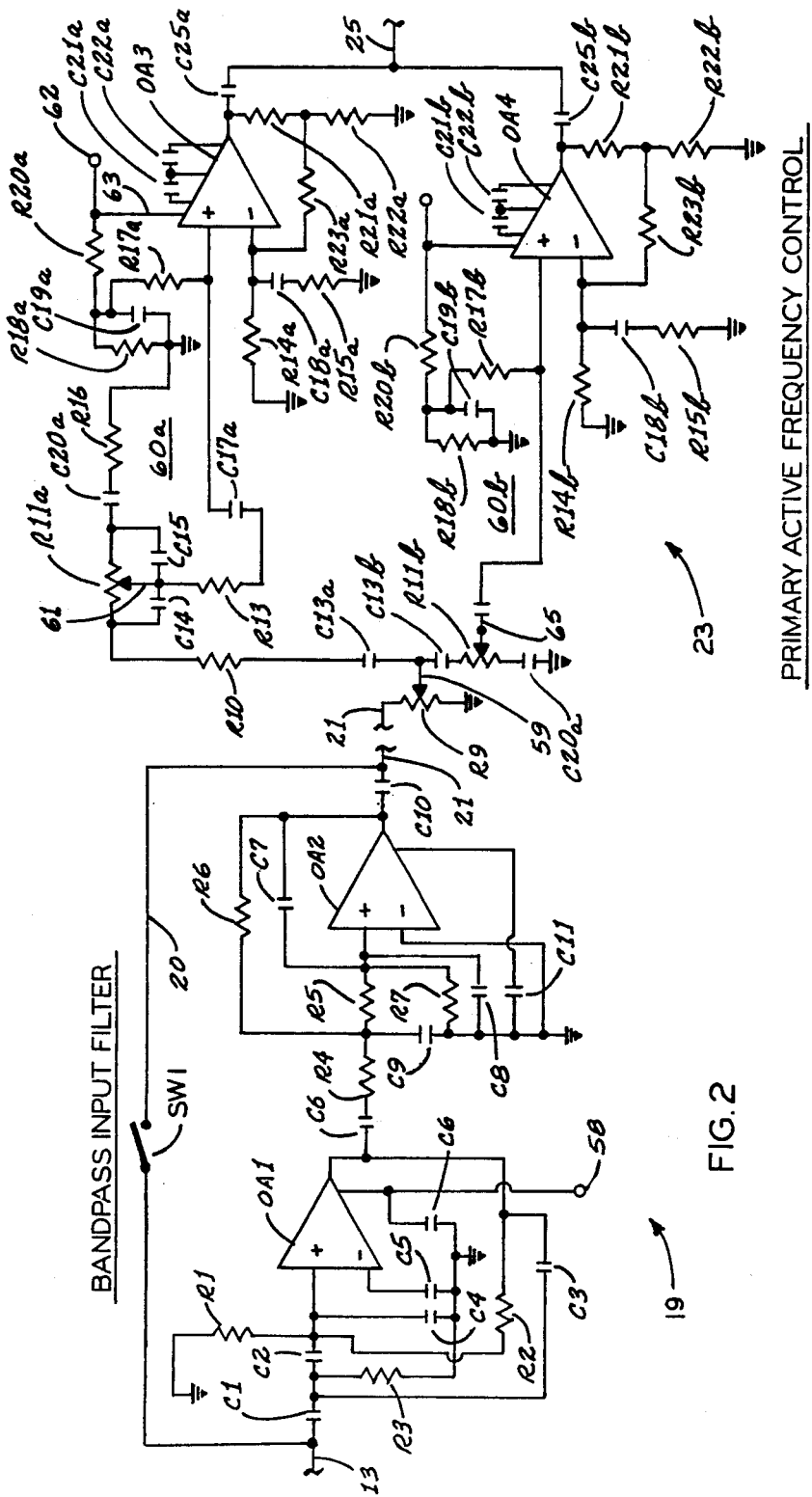
FIG. 2 is a schematic circuit diagram of a bandpass input filter of the circuitry of FIG. 1.
FIG. 3 is a schematic circuit diagram of a primary active frequency control circuit of FIG. 1.

Referring to FIG. 2, the circuitry of BIF 19 provides cascaded high and low frequency sections. An operational amplifier OA1 has its non-inverting input interconnected with input terminal 13 through C1, C2 and biased to ground through R1. Feedback between the output of the amplifier and the input is provided by C3 between C1 and C2 for providing capacitive feedback for tailoring frequency response. This node is also biased to ground through R3. The non-inverting and inverting inputs are connected to circuit ground through respective capacitors C4, C5. C6 conventionally bypasses power supply terminal 58 to circuit ground.

The output of operational amplifier OA1 is series-connected through C6, R4 and R5 to OA2. Capacitive feedback between its output and its non-inverting input is provided by C7 for frequency response control with d.c. feedback for gain control being provided by R6. It is noted that R7 and C8 are connected in parallel between the non-inverting input and circuit ground, the node common to R4, R5 and R6 is tied similarly to ground through C9. The inverting input of OA2 is tied directly to ground. The ouput of OA2 is provided through C10 to lead 21.

Capacitor C11 bypasses operational amplifier OA2 to circuit ground. Switch SW1, connected by lead 20 between input terminal 13 and lead 21, when closed renders BIF 19 inoperative, as when unnecessary to limit audio signals being processed to the narrow pass band ordinarily determined by BIF 19.

The selection of various components utilized in connection with OA1 and OA2 is a matter of design choice to achieve the bandpass upper and lower frequency limits referred to previously. Each of these operational amplifiers may be part of a single commercially available integrated circuit (IC) type such as LM387 exhibiting electrical characteristics and perimeters compatible with the node of intended usage of the present system and requiring power supply voltages (as delivered by terminal 58) of, for example, ±15 v.d.c. As will be fully understood to those skilled in the art, the circuit values such as that of R6 may be varied to control the gain of the bandpass input filter.

It is preferred that BIF 19 provide upper and lower corner frequencies of 2.7 kHz and 300 Hz, respectively, and a roll-off characteristic of −40 db. per decade, as well as very low third harmonic distortion (THD). BIF 19, preferably providing unity gain, can handle an input signal of preferably between −35 and +10 db. without clipping or distortion.

PAFC 23 utilizes operational amplifiers OA3, OA4 for control of the amplification of the gain of individual upper and lower frequency bands. Circuits 60a, 60b establish, with the respective operational amplifier, means for providing selective amplification and control of audio frequency components within the respective audio bands.

More specifically, the input signal provided by lead 21 is delivered across R9 having wiper 59 selectively variable for controlling the overall gain of stage 23. Since the two individual active frequency control circuits 60a, 60b have certain corresponding components which are connected in identical manner, corresponding elements are referred to by corresponding reference numerals with each numeral being followed by a subscript "a" or "b", as appropriate.

Circuit 60a is described exemplarily. C13a couples the signal at wiper 59 through R10 to R11a having wiper 61 providing high frequency gain control. Connected from opposite sides of R11 to its wiper are C14, C15. The signal at wiper 61 is provided through R13 and C17a to OA3, having its inverting input referenced to ground through resistor R14a, which is shunted by C18a and R15a.

The opposite end of R11a is grounded through C20a and R16. A frequency compensating circuit for OA3 comprises R17a and R18a and C19a. R20a references the node between R17a and R18a to the power supply potential provided to terminal 62 for offset error compensation. The power supply potential is also provided by lead 63 to OA3.

Negative feedback for operational amplifier OA3 is established by R21a, R22a and R23a. Compensating compactors C21a and C22a are connected conventionally to the operational amplifier.

As thus configured, circuit 60a (with OA3) is an active high frequency control circuit providing gain control over frequencies determined by the setting of wiper 61, with gain variable ±12 db within the frequency range of preferably about 1.5 kHz to 3 kHz. Gain peaking and attenuation peaking occurs preferably about 2.4 kHz. The output of OA3 is provided through C25a to lead 25. Similarly, circuit 60b (with OA4) is an active low frequency control circuit providing gain control frequency over frequencies determined by the setting of potentiometer wiper 65, determining signal levels provided to OA4 through C17b. The frequency band preferably is from 300 Hz to 1.5 kHz and with gain peaking and attenuation peaking occurring at preferably about 1 kHz. The low frequency components at the output of OA4 are delivered through C25b to output lead 25. OA3 and OA4 may both be of the commercially available IC circuit type UA739, which provides high loop gain without any substantial distortion.

The mixed high and low frequency audio components are delivered to PVC 27 (FIG. 4) which comprises an integrated circuit IC1 of the type used as a compressor-expandor and including a fullwave rectifier, a variable gain cell and an operational amplifier including a biasing system within it, all as shown in FIG. 4A. No specific description is necessary, since IC1 may be of commercially available type designated NE570/571. There is an internal summing node within the operational amplifier (now shown) which is biased at a voltage preference, and signals supplied to the integrated circuit are averaged by interconnected circuitry (FIG. 4). The averaged value of the input signal establishes the gain of the variable gain cell (FIG. 4A) which is then proportional to the average variance of the capacitively coupled input signal. The operation of such circuitry is described and will be understood by reference to co-assigned U.S. application Ser. No. 59,394 of Graham P. Bloy, entitled "Complete Audio Processing System", filed July 20, 1979 now U.S. Pat. No. 4,400,583, and co-assigned application Ser. No. 265,990 (PCT application No. PCT/US80/01331), now U.S. Pat. No. 4,368,435.

Although the gain cell of compandor circuit IC1 functions as an expandor, by providing negative feedback to the operational amplifier therein, compression is realized. Similar circuitry is utilized in SDC 37. IC1 is interconnected with appropriate resistive and capacitive circuit components.

In accordance with the invention, interconnected with the gain cell of the compandor circuit IC1 is lead 28 for providing a feedback signal of a limiting character from AGC circuit 29 as a function of the overall gain signalled by gain control circuitry 29. The AGC signal is provided to the gain cell of compandor IC1 through resistor R26. The overall purpose and function of this negative feedback is discussed below but it is noted preliminarily that the gain cell within IC1 is controlled in a negative sense in response to increase in the AGC signal supplied by lead 28, thereby to reduce the amount of primary compression achieved by PVC 27 with increasing gain feedback. Thus, the feedback is essentially negative or limiting.

Figure 8:
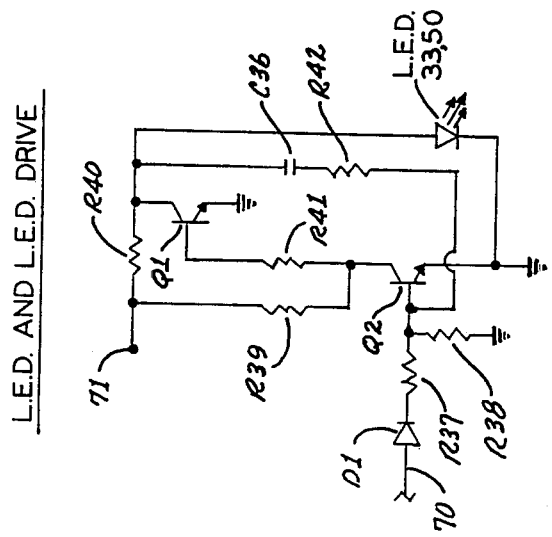
FIG. 8 is a schematic circuit diagram of an LED drive circuit including an LED indicator utilized in the system of FIG. 1.

A terminal 67 supplies low d.c. voltage for IC1. The dynamically compressed output signal is provided by C34 across R32, and is appropriately attenuated by R35 for delivery by lead 27 to SAFC (FIG. 5). However, prior to being coupled through C34, lead 30 provides the compressed audio output from PVC 27 to LED drive circuit 31 (FIG. 8). The output of PVC 27, a primarily compressed signal, includes both fundamental and harmonically related constituents of the original intelligence-carrying input signal. Although these harmonics are within the narrow 3 kHz pass band, they represent also, as sums or differences, frequencies outside the pass band.

In FIG. 8, circuitry is shown for constituting the LED drive 31 and LED 33, as well as the LED drive 49 and LED 50. The LED indicator lamp, whether that designated at 33 or that designated at 50, is driven by circuitry including transistors Q1, Q2. The base of Q2 is driven by a unipolar signal provided through diode D1 and delivered through R37. The base of Q1 is biased to ground through R38. Its collector is provided with a supply of potential by terminal 71 through R39, while R40 provides voltage supply to Q1's collector. The base of Q1 is connected through R41 to Q2's collector. Coupling is provided between the collector of Q1 and Q2's base by C36 and R42. This provides a two-transistor switching circuit wherein the LED will be driven on when there is sufficient base drive provided to Q2, as by the output signal of PVC 27, or SDC 37, respectively.

Referring to FIG. 5, SAFC 35 reconstitutes harmonic dynamics lost in processing of the signal through PVC 27. SAFC 35 comprises operational amplifiers OA5, OA6 connected to provide high and low pass sections of a Butterworth filter. OA5, OA6 may each be of commercially available type LM349, each part of a single integrated circuit powered by ±15 v.d.c., supplied via terminals 73, 74. Capacitors C38, C39 bypass these power supply inputs. The input signal is provided by lead 27 through C40 and R44 to OA5. R45 provides feedback for OA5, the input being biased to ground through R46.

The output of OA5 is provided through C42 to a frequency gain control circuit 75 having two parallel branches providing an input node 76 and an output node 77. A first branch comprises R47, R48 and resistor R49, with C43, C44 connected between opposite ends of R48 and its wiper 78. The wiper is interconnected through R50 and C46 to wiper 78 of R51 forming with R52 and R53 a second parallel branch. A node 79 between R50 and C46 provides input for OA6, and this input is biased to ground through R54. These component values are selected to provide a low pass Butterworth filter defined by the following equations:

$$T(s) = \frac{sK'_1}{s + B}$$

$$T(s) = \frac{s^2K'_2}{s^2 + 2Bs + B^2}$$

$$T(s) = \frac{s^3K'_3}{s^3 + 2Bs^2 = 2B^2s + B^3}$$

—continued $$T(s) = \frac{s^4K'_4}{s^4 + 2.613Bs^3 + 3.414B^2s^2 + 2.613B^3s + B^4}$$

For equations relating to the high pass section of the Butterworth filter, the transfer functions are as follows:

$$T(s) = \frac{s}{s + w_1}$$

$$T(s) = \frac{s^2}{s^2 + w_2s + w_2w_1}$$

$$T(s) = \frac{s^3}{s^3 + w_3s^3 + w_3w_2s + w_3w_2w_1}$$

$$T(s) = \frac{s^4}{s^4 + w_4s^3 + w_4w_3s^2 + w_4w_3w_2s + w_4w_3w_2w_1}$$

In accordance with these formulas, the SAFC 35 provides tailoring of the response curve between 300 Hz and 3 kHz. The low frequency section of SAFC 35 controls response between 250 Hz and 1200 Hz, the high frequency section controlling response between 1400 Hz and 3500 Hz. These figures are those preferred for various purposes contemplated for the invention but are not necessarily rigidly absolute for certain other applications, to which extent they may be subject to variation within the scope of the invention.

To provide such operation, OA5 is a buffer to ensure low driving impedance to circuits 75. C40 and R44 provide d.c. blocking and impedance matching for OA5's input. R45 provides feedback between the output and the non-inverting input of OA5. C42 provides d.c. blocking of OA5's output. High frequency control elements are R50, R52 and R53. R51 allows the high frequency section to establish between 0 and 22 db gain, preferably. The low frequency elements are R47, R49, R48, C43 and C44. R48 allows low frequency control preferably between 0 and 22 db gain. A feedback path is provided through node 77 by R49 and R53. C40 and C42 provide d.c. blocking and establish low frequency roll-off.

Devices other than type LM 349 noted above may be used but it is preferred that any integrated device substituted have a slew rate allowing undistorted full swing performance up to a frequency of 25 kHz. Also, the total harmonic distortion is preferably kept low being typically not greater than 0.05% [0 dbm (i.G.) 0.77 v.] across the complete audio spectrum.

Preferably, the low frequency section of SAFC 35 has a gain of 22 db with a low frequency lower 3 db corner (i.e., representing 3 db insertion loss) at 30 Hz and with a high frequency upper 3 db corner at 10 kHz.

In effect, SAFC 35 operates to provide, at any given instant of time, a power envelope of predetermined shape within the processed frequency band, and in accordance with the overall gain of SAFC 35 and the amplitudes of the lower and upper frequency sub-bands processed by it. This power envelope is provided to SDC 37, and thus determines via AGC 29 the control by PVC 27 over signal dynamics, whereby the system may reconstitute harmonics while responding to and preserving signal dynamics, quite unlike compressor or compandor techniques which diminish or destroy signal dynamics and produce characteristic "flatness".

FIG. 10 shows circuitry for providing regulated potentials suitable for the operational amplifiers of SAFC 35. Terminals 81, 82 provide a.c. line voltage across the primary winding 83 of a transformer having its secondary winding 84 connected across a full wave bridge rectifier 85. Across the latter is a first filtering of a.c. decoupling capacitor C48. Across it are R56, R57 which in turn each have connected across them capacitors C50, C51 to provide a floating ground node 86. The potentials on the opposite sides C50, C51 are provided to respective integrated circuits IC2, IC3, such as each of commercially available type UA7815 integrated circuit regulators. Each of IC1, IC2 provides a respective output 87, 88 to provide highly regulated voltages, preferably, ±15 v.d.c. and −15 v.d.c. for powering operational amplifiers OA5, OA6. Similar circuitry may be utilized for developing other supply potentials for operation of other components of this system. Alternatively, battery power supplies may be utilized.

Referring to FIG. 6, showing circuitry of SDC 37, lead 34 provides the signal from SAFC 35 across R59 and through C53, thence to a high frequency emphasis network of C54 and R60. R61 then couples the signal directly to OA7. Inputs of OA7 are tied together through C55 and R62, and are interconnected with gain cell 85 and full-wave rectifier 86, both portions of an integrated circuit compressor-expandor, i.e., compandor, device such as of commercially available type NE570/571, described below.

Such a device may also include an internal or self-contained integrated circuit operational amplifier but, in the case of the preferred circuit NE570/571, the internal operational amplifier is not utilized. Connections are instead made, as indicated in FIG. 6, to gain cell 85 and rectifier 86 components of such compandor circuit. Also, there are internal resistive components of compandor device including R63 connected to gain cell output 87. Node 88 represents the gain cell input, there being an internal resistor R64. Gain cell 85 is adapted to be controlled by rectifier 86 in accordance with a capacitance at terminal 89 of rectifier 86.

Briefly, rectifier 86 provides full-wave rectification of the signal input to compressor 37, as reflected at the output of operational amplifier OA7. Its output signal, as fed back to the rectifier, is averaged by the capacitance seen at terminal 89. The averaged signal is then provided to the gain cell 85 which in turn provides a gain control signal to the inverting input of OA7.

The capacitance provided at terminal 89 is established by capacitance expandor circuit 90 comprising OA8, OA9 interconnected with rectifier 86. Circuit 90 includes C56 which is interconnected between the output of OA9 and the non-inverting input of OA6, which is also interconnected with the capacitance input terminal 89. R65 couples the output of OA8 to the non-inverting input of OA9, which is biased to ground through D2 and D3. R66 provides a load across OA9's output.

R67 is internal to the preferred integrated circuit device NE570/571 whereby node 91 is the input to rectifier 86. R68 and C58 provide high frequency pre-emphasis for the input signal to rectifier 86, which is delivered by C59 from OA7. Similarly, C60 interconnects OA7's output with gain cell input 88.

Accordingly, there are interconnected with the output of OA7 two feedback paths, a first being provided to the gain cell 85 through C60 and R64. A second feedback path is provided through C59, the pre-emphasis network noted above, and R67 to rectifier 86. Rectifier 86 controls the gain provided by gain cell 85, which is an integrated circuit-realized current in, current out device with the ratio $I_{out}/I_{in}$ providing an overall gain which is an exponential function of the input signal. Since the gain cell output 87 is interconnected with the inverting input of OA7, the gain cell provides, in effect, negative feedback for causing compression of the input signal.

Furthermore, since circuit 90 operates to expand the apparent magnitude of C56 as a function of the relative dynamic amplitude range of the signal at the output of OA7, the amount of current provided by rectifier 86 to gain cell 85 is varied as a further function of the magnitude, i.e., dynamic range, of the signal being processed.

In addition to the foregoing feedback circuits, R70, R71 provide feedback between the output and inverting input of OA7. C62 provides a.c. bypass to ground. R70 and R71 provide d.c. feedback for OA7 since there is no d.c. feedback path through gain cell 85. Bias potential for the inverting input of OA7 through a resistor R72 by connection of a terminal 92 to a suitable potential. Terminal 93 supplies the gain cell with a THD trim potential or bias through R73 connected to wiper 94 of R74. Across R74 is a 3.6 volt d.c. potential supplied by terminal 95. D.c. shift trim for the gain cell input 88 is provided through R75 according to setting of wiper 96 of R76 across which is supplied a 3.6 volts d.c.

To limit the output of OA7, zener diodes D4, D5 are selected for threshold potentials of, e.g., 3 v., precluding the output of OA7 from exceeding predetermined levels, limiting its swing to avoid overloading any succeeding circuit stage, e.g., if excessive signals are caused by ignition or electrical noise, etc. C63 couples the output to lead 48, across which is load resistor R77.

Accordingly, SDC 37 comprises an operational amplifier (OA7) and feedback circuitry for providing a nonlinearly increasing negative feedback signal to the input in response to increase in the level of the tonally controlled audio signal on lead 36. Ignoring the change in attack time or response produced by capacitance expandor circuit 90, the signal gain is $$G_{comp} = \frac{K\, I_b^{\frac{1}{2}}}{\overline{V}_{in}}$$

where $I_b$ is the current flowing into an effective internal summing node of operational amplifier OA7, $\overline{V}_{in}$ is the average input voltage of the audio signal input to compressor 37 and K is merely a gain constant. Gain cell 85 provides an exponential response in gain in response to step changes in amplitude, said exponential response being effected by the time constant resulting from the capacitance represented by circuit 90 at terminal 89 of rectifier 86.

Figure 12:
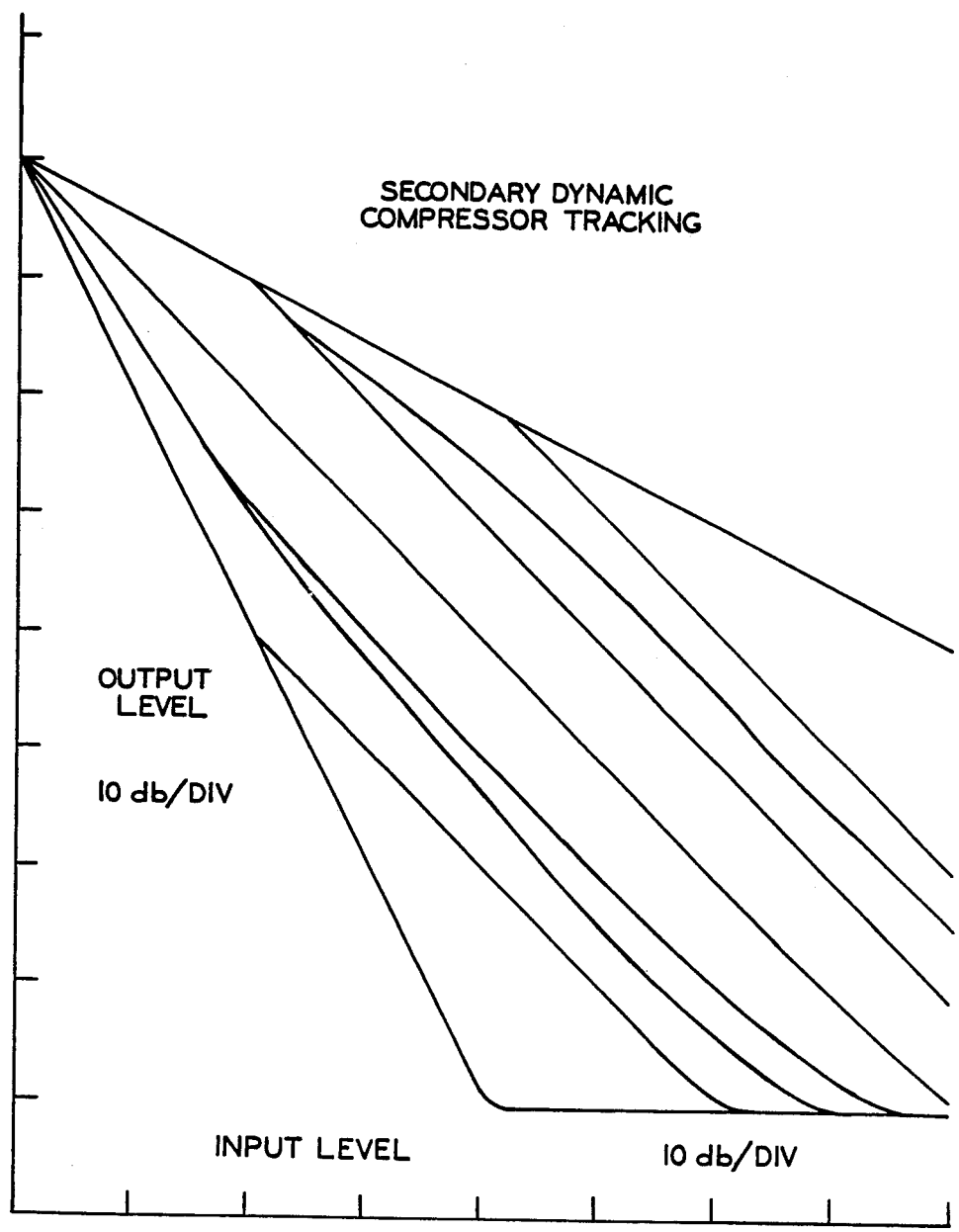
FIG. 12 is a graph of a family of curves illustrating operation of certain compressor circuitry of the invention.

In FIG. 12, a family of curves represents typical input-output tracking of compressor 37. The ordinate represents output level and the abscissa represents the input level.

Operational amplifier OA7 may be of commercially available type TDA1034 and OA8, OA9 may each be of commercially available type LM387.

Concerning SDC 37, operation in accordance with the invention involved reconstituting harmonics typically characteristic of human speech, among other aspects of operation, which otherwise would be of inaudible and of essentially ineffective amplitude owing to constraints imposed by normal compression or narrowband filtering normally encountered in modulation and RF transmission systems. Accordingly, it is desired that OA7 have a high slew rate and be capable of providing transmission of audio frequencies up to at least 15–16 kHz. Also, in the case of commercial types LM387 utilized for OA8, OA9, a minimum upper bandwidth is typically 75 kHz. Thus, the circuitry utilized exhibits high gain and wide bandwidth. For increased stability, in view of these characteristics, an input compensation network constituted by C53, C54 and R60 is utilized.

Circuit 90 effectively increases the capacitance at terminal 89, being the apparent magnitude of capacitor C56, in accordance with decrease in signal level, i.e., the dynamic input of SDC 37. Thus, in effect, the response time of SDC 37 is considerably longer at low signal levels, since circuit 90 operates effectively to speed up the compressor attack time at such low signal levels. For example, when the rectifier input level drops from 30 dbm to −30 dbm, the time constant increases from $10.7\, C_{rect} \times 10^3$ to $32.6 C_{rect} \times 10^3$, where $C_{rect}$ is the effective capacitance interconnected with rectifier 86. This in turn effects the gain cell response because gain cell 85 is controlled by rectifier 86. This avoids or greatly reduces any mistracking of low signal dynamics. Here it is noted that in compressor-expandor (compandor) systems in which the overall gain is unity such change in attack time would not produce any overall gain error, and the resultant gain or loss would appear to be manifested as such mistracking of low signal dynamics. But in the present system, such problem is largely averted, since unity gain is not necessarily provided.

Accordingly, SDC 37 is operating at high gain when there is a small input signal, but when a higher level input signal is provided to the circuit lead 34, the gain is reduced. Overloading is, however, precluded by the clamping action of D3, D4 and D5.

Furthermore, with regard to transient response, the time taken for recovery of SDC 37 from an overload condition is determined by the capacitance provided by circuit 90 at terminal 89. If there were a smaller capacitance, faster response to transients would be permitted but such would produce more low frequency THD because of gain modulation. The use of a relatively small capacitance, i.e., one microfarad for capacitor C56 and circuit 90 avoids such a difficulty in the present system.

Compressor-expandor systems are subject to a problem known as breathing. This comes about since, as a system is changing its gain, the change in background noise level sometimes can be heard. In order to avoid any comparable breathing, C54, R60, C58 amd R68 provide high frequency pre-emphasis by altering compression gain accordingly. It is preferred that SDC 37 provide up to 135 db of dynamic compression for a 0 db input signal, but the system does not function in an overall sense as a compressor or compandor since it responds to and retains signal dynamics in sharp contrast with compression systems.

Figure 9:
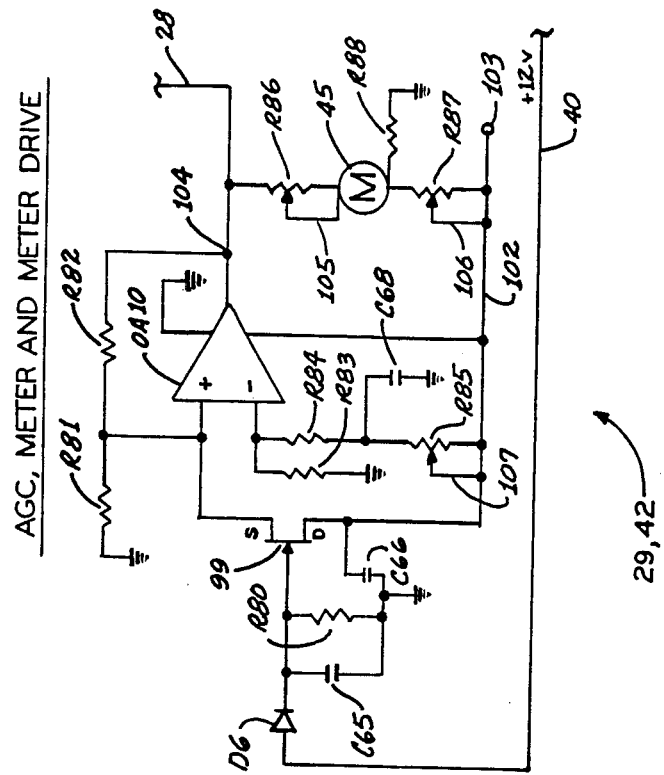
FIG. 9 is a schematic circuit diagram of circuitry of an automatic gain control as well as meter drive circuitry and a meter for indicating operation performance of the system of FIG. 1.

AGC circuit 29 is shown in FIG. 9. Lead 41 provides an input for signals processed by SDC 37. The output of SDC 37 effectively provides a tracking voltage provided by feedback circuit to the d.c. rectification stage, i.e., rectifier 86 and expandor circuit 90, of the secondary compressor 37, while serving also to deliver the processed audio signals to BIF 52. This AGC input is supplied to D6 for rectification and thence to the gate of FET 99. Connected between its gate and drain electrodes is a time constant delay circuit providing delayed AGC action, having C65 in parallel with R80, and C66 connected to the drain electrode of FET 99.

FET effectively isolates the input by its high impedance, changing its conductivity to change the signal level applied to the non-inverting input of OA10, which is biased to ground through R81 and interconnected to its output for feedback through R82 to establish gain control.

The inverting input is biased to ground through R83 and is connected through R84 and R85, which has wiper 101 tied to a lead 102 supplied by terminal 103 with positive voltage, whereby gain of OA10 may be controlled by setting wiper 101. C68 bypasses to ground any AC component present on lead 102. Lead 102 is interconnected with lead 103 for supplying OA10 with its operating voltage.

Connected between lead 102 and the output 104 of OA10 is a circuit comprising R86, R87 and meter 45, preferably of the moving coil type. Output 104 is tied directly to lead 28 for providing an AGC feedback connection to PVC 27. One side of meter 45 is connected to ground through R88. Wipers 105, 106 of R86, R87 provide meter calibration.

The meter indicates overall signal compression gain level and thus displays an indication of the extent to which the system is being utilized to capacity. Since the meter is of the moving coil type, it provides averaging of the instantaneous variations in the output of OA10 to avoid rapid changes in the indicated output which would be difficult to observe.

For proper operation, wiper 101 is adjusted to permit variation in the level of voltage provided to the inverting input of OA10 within a normal swing or variation in the potential at output 104 of from about +2 to about +9 v.d.c., which are of proper magnitude for PVC 27.

There is thus provided a feedback signal to PVC 27 from AGC 29 in accordance with the extent of compression by SDC 37. As a consequence, a negative or limiting feedback occurs which operates to provide the function of controlling the amount of THD by limiting the primary voltage compression as a function of the compression provided by SDC 37. Not only does the feedback serve to control overall dynamic compression but there is also a control of the bandwidth of the system by limiting out-of-band harmonics which would otherwise pass through the system as a result of THD.

For certain applications of the invention, one might permit rapid secondary reaction, so that the feedback to PVC 27 would operate to prevent an overload resulting from excesses in the output of SDC 37, avoiding output overdriving. E.g., digital signals of the type used for data transfer require such rapid reaction. Also in the case of data transmission rather than audio, narrow bandwidths are involved so that one need not provide capacity for handling harmonics normally present in speech or other audio, but only those typically characteristic. However, square and other pulse-form signals may be represented, as by a Fourier series of sinusoidal components spanning an indefinitely wide frequency range. Thus, such frequencies are of significance and may be transferred effectively by the system.

The amount of delay provided in the AGC delay path is preselected in accordance with applications of the system and the type and character of signals to be processed. Variation of the AGC time constant is provided by C65 and R80 which may be varied, as by selection of different components. Examples of the AGC delay which may be provided by C65 and R80 are from 0.010 seconds to 3 seconds, as a broadly preferred range, whereas 0.3-0.5 seconds delay may be typically adequate for various audio signals. In general, the delay is to be shorter, i.e., for faster response, for transmission of signals of the data character and slower such as 0.3-0.5 seconds or even longer for signals of audio or voice character. In this way, the amount of AGC feedback can be established in direct relevance to the amount of out-of-band harmonics expected to be present in the signals being transmitted.

As noted above, LED drive 49 and LED 50 are also connected to the output 48 of SDC 37 to indicate the amount of compression attained by SDC 37. LED 50 signals an overload condition resulting from excessive compression. Thus, for a normal 0 db input, i.e., 120 db compression, the control of the system may be adjusted to provide operation under conditions such that peak compression can be handled, as indicated by LED 50 during processing of signals, the controls being adjusted to prevent LED 50 from normally remaining illuminated.

The output of the secondary dynamic compressor 37, as thus monitored, is provided to BOF 52 (FIG. 7).

Referring to FIG. 7, OA11 receives processed signals through C70 and C71. The non-inverting input is biased to ground through C72. Node 108 is biased to ground through R89 and also is provided through C73 with a feedback signal from the output of OA11. A further feedback path is provided through R90 directly to the non-inverting input, which is biased to ground through R91. The inverting input is connected to circuit ground through C74. Terminal 109 provides d.c. operating voltage for OA11 and OA12, the two being both preferably part of the same integrated circuit such as that commercially available under type LM387.

OA11's output is coupled through C75, R92 and R93 to OA12, the input of OA12 being biased to ground through R94 and C76. Feedback for operational amplifier OA12 is provided by R95 connected between the output and node 110 between R92 and R93 which node is bypassed to ground through C77. Feedback is also provided directly to the non-inverting input through C78. The inverting input of OA12 is bypassed to ground through C80.

Thus, BOF 52 has high and low frequency sections, preferably providing low frequency gain of 22 db with the low frequency upper 3 db corner at 30 Hz and with the high frequency upper 3 db corner at 10 kHz. BOF 52 provides a much greater pass band than BIF 19.

Switch SW2 is connected in a lead 53 from input 48 to output 15 and, when closed, bypasses BOF 52 as may be desired for testing or specialized purposes of the invention, or when processing narrow band signals which do not require further filtering after processing. Lead 55 supplies the output of BOF 52 to the HLO stage 56 (FIG. 11).

Loudspeaker 57 or other suitable transducer may be connected directly or indirectly to output 15. Such a device is a recombiner for recombining frequency components of the various in-band electrical signals present at output 15 and providing a recombined audio signal in which are present reconstituted harmonics characteristic of the original signals provided to the system. Other linear recombiners, including solid state devices, may also be used. Therefore, the processed signal present on output 15 may be provided to the modulator of a transmitter, transmitted via carrier signal, recovered by demodulation and then provided to a recombiner. In this way, frequencies normally outside the passband will have been transmitted and, by recombination at the recombiner, are reproduced.

Referring to FIG. 11, lead 55 provides the processed audio frequency signal C81 to the input terminal of IC4. Terminal 111 provides operating voltage, through R99, for powering IC4. Amplifier circuit 56 operates in effect to provide a buffering of output 15 and for providing high level, e.g., with 40 db gain, useful for driving various auxiliary apparatus, such as oscilloscopes, monitor displays, frequency counters, spectrum analyzers, and the like.

The AGC feedback signal to PVC 27 limits primary compression as a time-delayed function of increase in the level of the output of SDC 37. PVC 27 and SDC 37 may be regarded as respective first and second dynamic control means, PAFC 23 and SAFC 35 as respective first and second sub-band or tonal control means, since both compressors and both active frequency controls are configured for permitting selective controlling of their respective functions. BIF 19 and BOF 52 each may be selectively switched in or out of the signal processing path.

Since system circuitry requires no inductive elements, is transformerless and utilizes integrated circuits and associated discrete components, the system can be configured in many ways. One especially preferred configuration is that having the circuitry divided between two integrated circuit devices, e.g., of DIP type, one having requisite processing circuits, all of which may be provided by single VSLI chip, the other being a programming device having all other circuit elements necessary for establishing, i.e., programming, parameters necessary for operation by the VSLI chip device for a particular dedicated use of the system. Thus, the same VSLI chip device may be used for many different systems applications by changing only the programming device.

METHOD OF OPERATION OF THE SYSTEM

The system shown in FIG. 1 is connected to a suitable source of audio signals, such as the output of a microphone, pre-amplifier, tape recorder, or the output of various intermediate stages present in transmitters, receivers or the like where it is desired to utilize the system for processing audio signals provided by such a source. The source may be at either end of an RF transmission link. If the source is the intermediate amplification stage of a modulation system providing an audio signal to modulate an RF signal, as in AM. FM, SSB, etc., the system may be utilized for improving intelligibility and clarity of such audio signals utilized for modulation, thereby improving the character of the transmitted radio frequency information, even though such may be in a relatively narrow band such as 3 kHz. Also, the source may be an intermediate amplification stage of a receiver which amplifies a demodulated audio signal, which similarly may be of a very limited bandwidth as received, and will retrieve from the received modulated audio signals the available clarity, intelligibility and general characteristics of normal human voice or other tonal signals. In such uses, the system enhances the character of the signals transmitted or received to achieve the various objects of the invention.

But such use of the system is not necessarily limited to only one end of an RF transmission link. Instead, a system of the invention may be utilized at each end of such a link. And, when so utilized, the two systems or units of the invention effectively multiply the phenomena produced by the single system on either end of such a link. When utilized on both ends, the system processes both the transmitted and received audio information to add substantial dynamic range as well as improve the S/N ratio. In the strict sense, the system is not a compressor-expander (compandor), since a compandor is a combination of a compressor at one point in a communication path for reducing the amplitude range of signals followed by an expandor at another point for complementary increase in the amplitude range for increasing the S/N ratio.

Regardless of its use in one of the types of situations referred to above, and as more fully contemplated in accordance with the objects of the invention and as described here and above, the new system provides overall performance which goes well beyond that of a compandor in the customary sense, since it not only improves S/N ratios but also reconstitutes lost harmonics and improves clarity, intelligibility and generally enhances the character of signals processed therethrough. Without use of the new system, the usually audible characteristics of human speech, involving various harmonics particularly of the higher order which gives life-like, normal character as well as richness and quality to human speech are typically so suppressed or reduced in magnitude in narrow band transmission as to deprive the received voice signals of character and intelligibility. The processing of audio signals by the invention involves effective reconstitution of these various harmonically related attributes of speech so that the processed audio has a richness characterized by the presence of out-of-band harmonics which have been returned to the processed audio, producing normal life-like, intelligibility of the audio signal, particularly speech.

Effectively, one may think of the operation of the system as first involving the pulling out or limiting certain outof-bnad harmonics which normally would be present in signals amplified, and then subsequently returning such harmonics to the signal in such a way that they are emphasized to advantage. The system may be likened to a crystal oscillator circuit which, through ringing, may be utilized to create harmonics. The new system returns harmonics of human speech to audible levels of fundamental frequency. This manifestation is best appreciated only upon objective aural comparison between signals from various sources processed, and those not processed, through use of the invention. The circuit values of the LED drive circuits 31, 49 are each chosen to provide for energization of the respective LED 33, 50 when the output of PVC 27 and SDC 37 respectively interconnected with each drive circuit is providing maximum compression. Thus, referring to LED 33, adjustment of gain potentiometer R9 allows the output of the primary voltage compressor 27 to reach its full maximum value, thus being indicated by illumination of LED 33. This LED will remain unlit when PVC 27 is operating at less than full compression. The overall system gain may be varied to allow normal operation to proceed so that LED 33 would only light upon maximum peak magnitude of signals being processed. Similarly, potentiometer wiper 84 of SDC 37 is adjusted so that LED 50 normally will remain unlit but will flash momentarily only at maximum peak signal levels. Meter 45 provides an indication of the extent to which the system is operating to the extent of its capabilities thus displaying the overall performance of the system.

The indication of meter 45 when speech signals are being processed gives visual indication of the averaged output voltage of SDC 37, but at the same time the meter will indicate fluctuation in dynamic audio content. This indication is particularly useful when speech is being processed through the system. However, it is noted that when data signals are processed through the system, such as in the case of facsimile or teletype signals, meter 45 produces only an average reading from any given dynamic fluxation pattern, since dynamic voltage peaks will appear far too fast to be tracked by the moving coil type movement. On the other hand, the indication provided by LED 50 is such that any rapid increase in signal which may be in excess of the maximum compression utilizable will be instantaneously displayed by flashing of the LED.

GENERAL DESIGN AND METHODOLOGY

The general design of the processing system of this invention is explained and modelled mathematically as follows:

An input signal to the system goes into BIF 19. The operation of this filter is described by a transfer function developed in the following manner:

Define:
  $n$ = the number of poles in the bandpass input filter.
  $\omega_L$ = the low cutoff frequency of the filter.
  $\omega_H$ = the high cutoff frequency of the filter.
  Let $s_k = e^{j\pi(2k+n-1)/2n}$, for $k = 1, 2, \ldots, n$.

Then the transfer function is defined by:

$$H_{BIF}(s) = \frac{k_o}{\displaystyle\prod_{k=1}^{n}\left[\frac{s^2 + \omega_L \omega_H}{s(\omega_H - \omega_L)} - s_k\right]}$$

where $k_o$ is a normalizing constant.

The output signal amplitude spectrum of BIF 19 is determined by evaluating $|a_i H(j\omega_i)|$ for each component in the input signal with amplitude $a_i$ and frequency $\omega_i$. This amplitude spectrum may be computed as it passes through the system by using the following equations in the same manner as for BIF 19.

The signal is next passed to PAFC 23. There it is acted upon in two separate paths: a low frequency path and a high frequency path. The output of the low frequency path is determined by the transfer function:

$$H_L(s) = a_{PAFC} H_1(s) \, H_2(s)$$

The output of the high frequency path is determined by the transfer function:

$$H_H(s) = a_{PAFC} H_3(s) \, H_4(s)$$

where:
  $a_{PAFC}$ = circuit gain setting
  $H_1(s)$, $H_2(s)$, $H_3(s)$, $H_4(s)$ = four bandpass filter transfer functions. PAFC 23 for any sub-band a transfer function which is:

$$H_i(s) = \frac{k_o}{\displaystyle\prod_{k=1}^{n_i}\left[\frac{s^2 + \omega_{Li} \omega_{Hi}}{s(\omega_{Hi} - \omega_{Li})} - s_{ik}\right]}$$

with, $s_{ik} = e^{j\pi(2k+n_i-1)/2n_i}$ $n_i$ = number of poles in the $i^{th}$ sub-band $\omega_{Li}, \omega_{Hi}$ = low and high cutoff frequencies for the $i^{th}$ sub-band The output of PAFC 23 is obtained by summing the signals from the low and high frequency (plus any additional) paths, thus giving an overall PAFC transfer function as:

$$H_{PAFC}(s) = H_L(s) + H_H(s)$$

The signal next passes into PVC 27. Its relative output voltage is determined by the equation (note: dB=20 log v):

$$dB_{out} = a_{PVC} + b_{PVC} * dB_{in}$$

where $bB_{in}$ is the relative input voltage from PAFC 23, the coefficients, $a_{PVC}$ and $b_{PVC}$, are determined by the level of the AGC feedback voltage from SDC 37.

SAFC 35 receives the signal from PVC 27. As in the PAFC, SAFC acts on the signal in both low and high frequency paths. The low frequency path has a transfer function of the form:

$$H_L(s) = a_{SAFC} b_{SAFC} H_1(s)$$

and the high frequency path:

$$H_H(s) = a_{SAFC}(1/b)_{SAFC} H_2(s)$$

where $a_{SAFC}$ and $b_{SAFC}$ are two variable gain setting constants, which can be set to balance the signal level in the two paths $H_1(s)$, $H_2(s)$ = two bandpass filter transfer functions. For any sub-band, the transfer function is:

$$H_i(s) = \frac{k_o}{\prod_{k=1}^{n} \left[ \frac{s^2 + \omega_{Li} + \omega_{Hi}}{s(\omega_{Hi} - \omega_{Li})} - s_{ik} \right]}$$

$s_{ik} = e^{j\pi(2k+n_i-1)/2n_i}$ $n_i$ = number of poles in the $i^{th}$ sub-band $\omega_{Li}, \omega_{Hi}$ = low and high cutoff frequencies for the $i^{th}$ sub-band The output signal of SAFC 35 is obtained by summing the signals from the low and high frequency (and any additional) paths, resulting in an overall transfer function of:

$$H_{SAFC}(s) = H_L(s) + H_H(s)$$

The signal is next passed into SDC 37. Its output voltage is given by the equation:

$$V_{out} = a_{SDC} + b_{SDC} * dB_{in}$$

The output voltage also serves as the source signal for the AGC feedback via AGC 29 to control the operation of PVC 27. In order to maintain the dynamics of the original input signal, however, the AGC signal is delayed by an appropriate time, $\Delta\tau$. Thus, the PVC control at time comes from:

$$V_{AGC}(\tau) = v_{out}(\tau - \Delta\tau)$$

The effect of this control voltage is to adjust the gain and compression levels at which the PVC module operates.

From SDC 37, the signal is passed to BOF 52. It has a transfer function of the form:

$$H_{BOF}(s) = \frac{k_o}{\prod_{k=1}^{n} \left[ \frac{s^2 + \omega_L \omega_H}{s(\omega_H - \omega_L)} - s_k \right]}$$

where $s_k = e^{j\pi(2k+n-1)/2n}$ n = the number of poles in the filter $\omega_L, \omega_H$ = the low and high cutoff frequencies of the filter The output of BOF 52 is essentially the electrical output of the new system prior to recombination. It consists of a number of frequency components concentrated within the pass band of the system. These components all have essentially the same amplitude. When this complex signal is passed through a combiner (such as a loudspeaker, other transducer or solid state device), the generated harmonics will tend to reinforce each other at the frequencies corresponding to the original input frequencies. This reinforcement will even reproduce the input frequencies that lie completely outside of the pass band of the system.

As a simplified example, consider a case in which there are two fundamental frequencies in the original input signal, with $f_1$ in the bandpass and $f_2$ outside. These two frequencies will produce a beat frequency $f_2 - f_1$ within the bandpass. The output signal will consist of $f_1$ and $f_2 - f_1$ (plus other harmonics). When these two are recombined in an external speaker, the beat frequency $(f_2 - f_1) + f_1$ will be produced. Thus, the original frequency $f_2$ will be regenerated even though it was not present in the system output signal during transmission.

For the general case, $f_1, \ldots f_n$ be a set of original fundamental frequencies. The system input signal will contain all of the beat frequencies of these fundamentals, up to the third harmonics. That is, the input frequency spectrum will consist of:

all original fundamentals: $f_1, \ldots, f_n$ all second harmonics: $2f_1, \ldots, 2f_n, \pm f_1 \pm f_2 \pm f_3, \ldots$ all third harmonics: $3f_1, \ldots, 3f_n, \pm f_1 \pm f_2 \pm f_3, \ldots$ and so forth.

The system output signal spectrum will contain those frequencies from the above list that are within the band pass of the system, say within the range from $f_L$ to $f_H$. With a reasonably random distribution of original fundamentals, there will be a large number of these harmonic frequencies within the pass band. Frequencies will be available that contain all of the information of the original frequency spectrum, and in fact the original spectrum will be essentially recreated by the beat frequencies generated by the system output signal.

The foregoing mathematical model of the system can be validated by use of a large general purpose digital computer. For this purpose, one may validly assume that a voice signal can be represented at any given moment by a discrete number of separate components of differing frequencies which may be termed key frequencies. The following example illustrates the operation of the new processing system by use of such a computer modeling technique.

EXAMPLE

Figure 13:
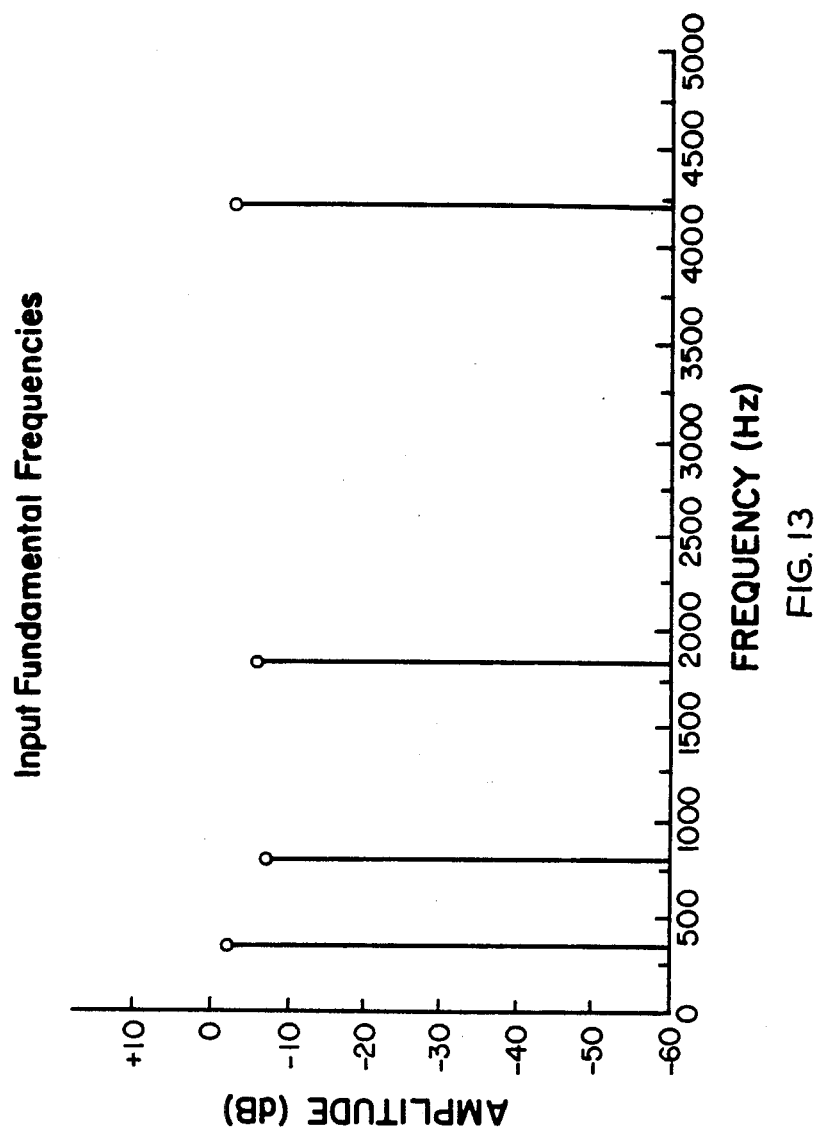
FIG. 13 is a graph on which are plotted the amplitude versus frequency of certain signals of representative fundamental frequencies provided as input signals for the system of FIG. 1.

It is assumed that a 3 kHz pass band is established by processing circuitry of the system. Frequency components representative of a voice signal to be processed by the system are randomly selected, providing frequencies of 350, 801.3, 1834.52 and 4200 Hz, thus representing input fundamental frequencies. Table I shows the amplitude and frequency of the fundamental input signals and other signals at various points of the system, and resulting from processing by the system. Referring to FIG. 13, the amplitudes of these input fundamentals, which vary, are plotted as a function of frequency. The amplitudes, like the frequencies, of these fundamentals are arbitrarily representative of voice constituents at a given moment.

Figure 14:
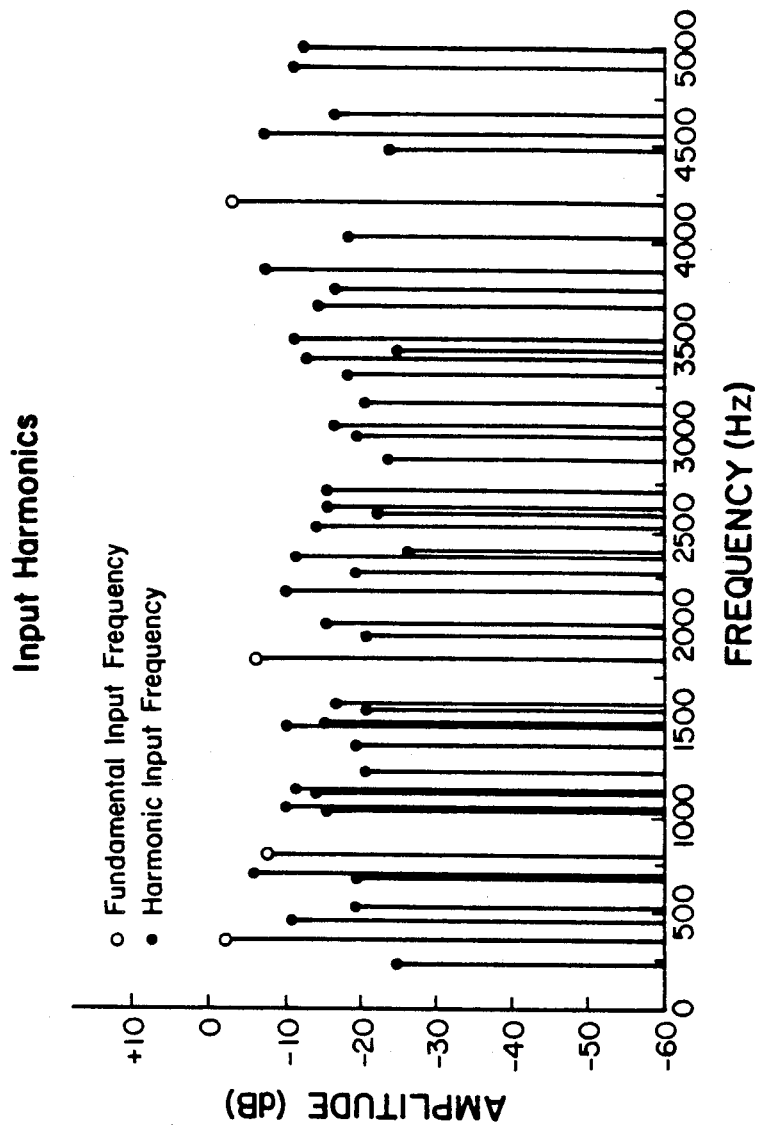
FIG. 14 is a graph on which are plotted the amplitude versus frequency of the fundamental frequencies as well as harmonic inputs which result from these representative fundamental frequencies.

Because of these input fundamentals, a variety of beat frequencies are produced. Their magnitudes and frequencies are shown in Table I under the heading "Input Harmonics Generated By Fundamental Frequencies". It will be understood that the input fundamental frequencies produce beat frequencies according to the sums and differences of the input fundamental frequencies. FIG. 14 represents a depiction of the amplitude of the resultant input harmonics as a function of their frequencies. As will be apparent, there are input harmonics which extend well beyond the upper limit, 3000 Hz, of the pass band. In FIGS. 13-17, the illustration of frequencies does not extend beyond 5000 Hz for purposes of facilitating illustration but it will be understood that higher frequencies are involved. Similarly, Table I arbitrarily is limited to an uppermost frequency of slightly greater than 10 kHz although higher frequencies are involved. From FIG. 14, it will be seen that the four input fundamentals provide numerous harmonic input frequencies of varying amplitudes. Many of these are beyond the upper pass band limit of 3000 Hz.

Figure 15:
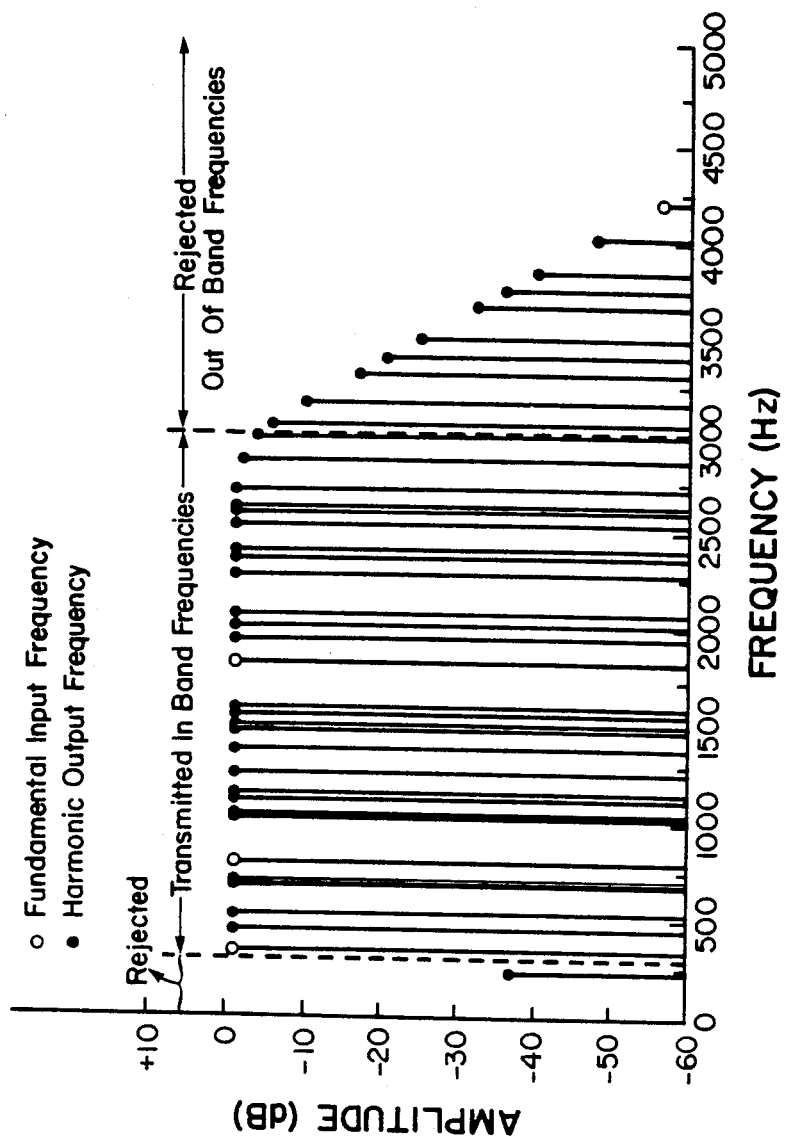
FIG. 15 is a graph on which are plotted the amplitude versus frequency of the fundamental input frequencies and harmonically related signals resulting in various output signals after processing by the system, and demonstrating the rejection of certain out-of-band frequencies and transmission of in-band frequencies.

FIG. 15 illustrates the output signals present at output 15. Thus, in FIG. 15 are plotted, as a function of frequency, the amplitude of signal components provided after processing by the system. These include harmonics as well as input fundamentals. The transmitted in-band frequencies are seen to be each at substantially 0 dB level, or slightly less, and with a roll-off beginning at about 2750 Hz and with sharp attenuation being thus provided at all frequencies above 3000 Hz. Therefore, signal components above 3000 Hz may be termed rejected out-of-band frequencies, the levels of which are of negligible value, being less than −60 dB above 4250 Hz.

Similarly, the lower limit of the pass band, being approximately 300 Hz, provides sharp attenuation of all signal components having less than this frequency. Only one harmonic, namely, 231.92 Hz, is shown and its magnitude is −36.9 dB. The levels of the various components at the output are shown in Table I in the column designated "Amplitude of Harmonic and Fundamental Frequencies from System", which may be compared to the adjacent column designated "Amplitude of Input Frequencies to System".

Figure 16:
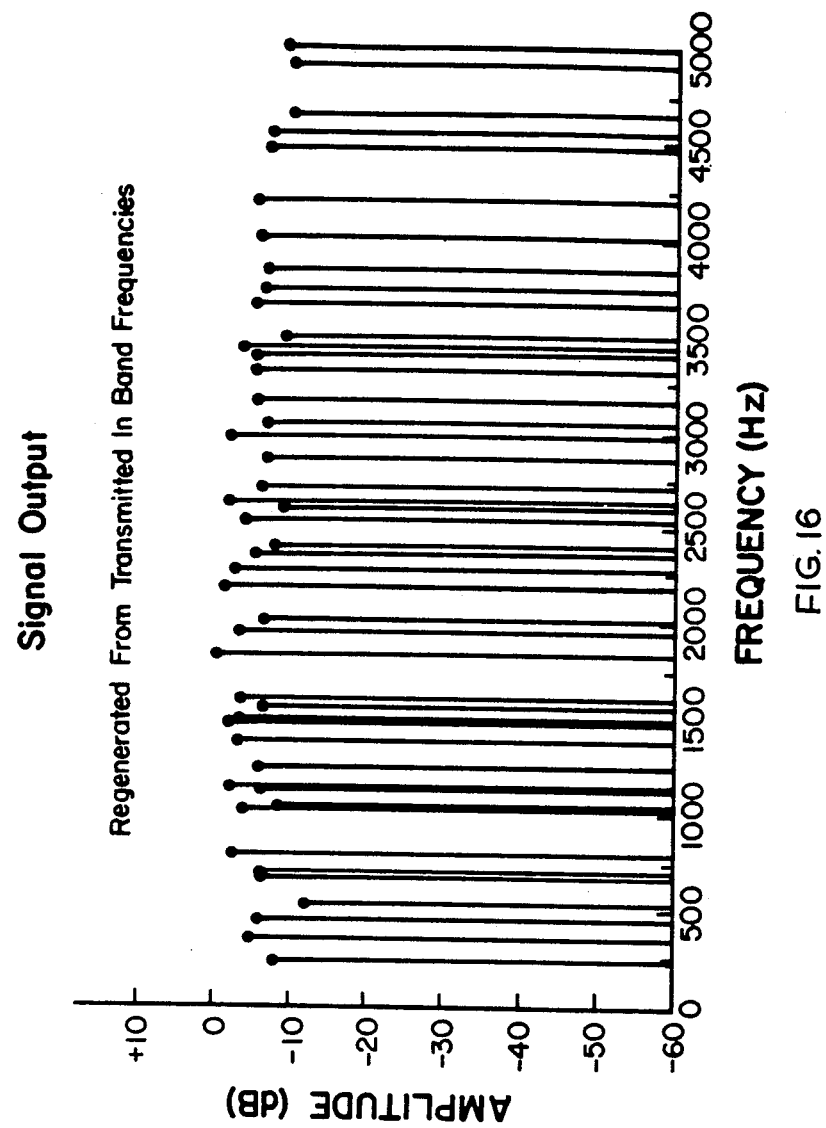
FIG. 16 is a graph on which are plotted the amplitude versus frequency of certain output signals harmonically related to the input signals which are regenerated from the transmitted in-band frequencies.

When the signals at the output 15 are provided to a recombiner, such as a loudspeaker or other transducer, the signal components shown in FIG. 15 regenerate a series of signal components shown in FIG. 16. Such components, as explained previously, extend well beyond the 5000 Hz upper limit of the graph and there is substantial variation in the amplitudes of these various output signals, which are harmonically related to the input signals.

TABLE I

| INPUT FUNDAMENTAL FREQUENCIES (Hz) | INPUT HARMONICS GENERATED BY FUNDAMENTAL FREQUENCIES (Hz) | AMPLITUDE OF INPUT FREQUENCIES TO SYSTEM (dB) | AMPLITUDE OF HARMONIC & FUNDAMENTAL FREQUENCIES FROM SYSTEM (dB) | AMPLITUDE OF SIGNAL OUTPUT AFTER RECOMBINATION (dB) |
|---|---|---|---|---|
| | 231.92 | −24.74 | −36.90 | −7.71 |
| 350.00 | | −1.95 | −1.19 | −4.67 |
| | 451.30 | −11.27 | −1.17 | −5.58 |
| | 530.96 | −19.40 | −1.18 | −11.84 |
| | 683.22 | −19.36 | −1.18 | −6.09 |
| | 700.00 | −5.90 | −1.15 | −5.88 |
| 801.30 | | −7.32 | −1.16 | −2.22 |
| | 1033.22 | −15.41 | −1.17 | −3.59 |
| | 1050.00 | −9.84 | −1.16 | −8.25 |
| | 1134.52 | −13.98 | −1.17 | −5.76 |
| | 1151.30 | −11.27 | −1.17 | −1.92 |
| | 1252.60 | −20.60 | −1.18 | −5.67 |
| | 1383.22 | −19.36 | −1.15 | −2.93 |
| | 1484.52 | −10.04 | −0.93 | −1.74 |
| | 1501.30 | −15.22 | −0.90 | −3.09 |
| | 1564.18 | −20.64 | −0.92 | −6.20 |
| | 1602.60 | −16.65 | −0.97 | −3.17 |
| 1834.52 | | −6.09 | −1.12 | −0.00 |
| | 1952.60 | −20.60 | −1.17 | −3.05 |
| | 2015.48 | −15.26 | −1.16 | −6.12 |
| | 2184.52 | −10.04 | −1.15 | −1.04 |
| | 2285.82 | −19.36 | −1.18 | −2.41 |
| | 2365.48 | −11.31 | −1.16 | −4.94 |
| | 2403.90 | −25.97 | −1.19 | −7.37 |
| | 2534.52 | −13.98 | −1.19 | −3.58 |
| | 2597.40 | −21.88 | −1.24 | −8.63 |
| | 2635.82 | −15.41 | −1.25 | −1.39 |
| | 2715.48 | −15.26 | −1.38 | −5.66 |
| | 2867.74 | −23.50 | −2.21 | −6.50 |
| | 2985.82 | −19.36 | −4.11 | −1.67 |
| | 3048.70 | −16.50 | −5.90 | −6.37 |
| | 3166.78 | −20.64 | −10.39 | −5.01 |
| | 3319.04 | −18.12 | −17.03 | −4.90 |

TABLE I-continued

| INPUT FUNDAMENTAL FREQUENCIES (Hz) | INPUT HARMONICS GENERATED BY FUNDAMENTAL FREQUENCIES (Hz) | AMPLITUDE OF INPUT FREQUENCIES TO SYSTEM (dB) | AMPLITUDE OF HARMONIC & FUNDAMENTAL FREQUENCIES FROM SYSTEM (dB) | AMPLITUDE OF SIGNAL OUTPUT AFTER RECOMBINATION (dB) |
|---|---|---|---|---|
| | 3398.70 | −12.55 | −20.57 | −4.85 |
| | 3437.12 | −24.74 | −22.32 | −3.27 |
| | 3500.00 | −11.12 | −25.07 | −8.56 |
| | 3669.04 | −14.17 | −32.55 | −4.82 |
| | 3748.70 | −16.50 | −36.05 | −6.05 |
| | 3850.00 | −7.17 | −40.43 | −6.51 |
| | 4019.04 | −18.12 | −48.00 | −5.45 |
| 4200.00 | | −3.23 | −56.28 | −5.24 |
| | 4470.34 | −23.50 | −72.43 | −6.69 |
| | 4550.00 | −7.17 | −79.03 | −6.88 |
| | 4651.30 | −16.50 | −400.00* | −9.65 |
| | 4900.00 | −11.12 | −400.00 | −9.63 |
| | 5001.30 | −12.55 | −400.00 | −8.77 |
| | 5233.22 | −20.64 | −400.00 | −10.83 |
| | 5351.30 | −16.50 | −400.00 | −9.27 |
| | 5503.56 | −22.26 | −400.00 | −14.95 |
| | 5684.52 | −15.26 | −400.00 | −12.20 |
| | 5802.60 | −21.88 | −400.00 | −12.11 |
| | 6034.52 | −11.31 | −400.00 | −11.75 |
| | 6384.52 | −15.26 | −400.00 | −12.54 |
| | 6565.48 | −16.54 | −400.00 | −18.21 |
| | 6835.82 | −20.64 | −400.00 | −15.53 |
| | 7598.70 | −17.78 | −400.00 | −23.43 |
| | 7869.04 | −19.40 | −400.00 | −25.07 |
| | 8050.00 | −12.40 | −400.00 | |
| | 8400.00 | −8.45 | −400.00 | |
| | 8750.00 | −12.40 | −400.00 | |
| | 9201.30 | −17.78 | −400.00 | |
| | 10234.52 | −16.54 | −400.00 | |

*In the table, −400 dB is used in the real time computer analysis, by which the table is derived, to represent any magnitude less than −80 dB.

The resultant signals are audio components shown in the extreme right-hand clumn of Table I, having the heading "Amplitude of Signal Output After Recombination".

Referring to FIG. 17, the input signals of FIG. 14 and output signals of FIG. 15 are plotted continuously and designated as "METME Input" and "METME Output", respectively. The arbitrary term METME derives from an acronym for "Maximum Efficiency Transfer of Modulated Energy", being thus symbolic of the processing effect of the new system. FIG. 17 also shows, continuously plotted, the audio signal output regenerated from the transmitted in-band frequencies. As will be manifestly apparent, the resultant audio signal output curve substantially follows the input signal curve but has relatively greater amplitude throughout the extent of the graph which, as noted, does not extend beyond 5000 Hz although resultant audio components do exist above 5000 Hz, as shown in Table I. Therefore, audio signals are provided after processing having frequencies well above and below the pass band limits. These signals result from the regeneration of components transmitted within the pass band. The system accordingly regenerates original frequencies even though the pass band severely limits the actual frequencies of signal components which may, for example, be transmitted by narrow band radio frequency techniques.

The data in Table I are those calculated by use of a large general purpose digital computer in accordance with the mathematical constraints represented in the foregoing description. Harmonics higher than the third, being normally of very low amplitude, may be neglected in such computer simulations. The amplitudes of all assumedly existent harmonics, i.e., sums and differences, are calculated according to the amplitudes of signal constituents, such as input fundamentals for convenience. The second and third harmonics may be established as 2 dB and 4 dB, respectively, lower than the fundamental. Also, the amplitudes of higher frequency signal constituents are reduced in accordance with the normal roll-off of human hearing and speech characteristics.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A signal processing method for the transmission of intelligence-carrying signals having a frequency range greater than the pass band available for the transmission, the method comprising selectively controlling the relative level of signals in a plurality of sub-bands within the said pass band to define a range of original signal constituents including signal fundamentals and harmonically-related components of said fundamentals, primarily dynamically compressing the range of original signal constituents, selectively controlling the amplitudes in a plurality of sub-bands within the said pass band of signal components of the dynamically compressed signal to define a predetermined power envelope of signal constituents, further dynamically compressing the signal constituents of the power envelope to provide processed signal constituents while providing time-delayed limiting of compressing of the original signal constituents to permit dynamic variation of the processed signal constituents, and recombining the intelligence-carrying signals and recover original frequencies beyond the pass band, characterized in that each of the steps of selective control in a plurality of sub-bands is effected in i sub-bands each having transfer function of the form:

$$H_i(s) = \frac{k_o}{\prod_{k=1}^{n_i}\left[\frac{s^2 + \omega_{Li}\omega_{Hi}}{s(\omega_{Hi} - \omega_{Li})} - s_{ik}\right]}$$

where $s_{ik} = e^{j\pi(2K+ni-1)/2ni}$ $n_i$ = number of poles in the $i^{th}$ sub-band $\omega_{Li}, \omega_{Hi}$ = low and high cutoff frequencies for the $i^{th}$ sub-band.

2. A method according to claim 1 characterized in that the first selective control is effected in at least a low frequency path having a transfer function:

$$H_L(s) = a_{PAFC}H_1(s)H_2(s)$$

and a high frequency path is determined by the transfer function:

$$H_H(s) = a_{PAFC}H_3(s)H_4(s)$$

where $a_{PAFC}$ is a gain setting constant and $H_1(s)$, $H_2(s)$, $H_3(s)$, $H_4(s)$ are filter transfer functions and provides an overall transfer function which is:

$$H_{PAFC}(s) = H_L(s) + H_H(s).$$

3. A method according to claim 2 wherein the primary dynamic compression provides a relative output voltage defined by:

$$bB_{out} = a_{PVC} + b_{PVC} * dB_{in}$$

where the coefficients, $a_{PVC}$ and $b_{PVC}$, are determined by the level of a feedback voltage, and where $dB_{in}$ is the relative input voltage.

4. A method according to claim 1 wherein the second selective control is effected in at least a low frequency path having a transfer function of the form:

$$H_L(s) = a_{SAFC}b_{SAFC}H_1(s)$$

and a high frequency path having a transfer function of the form:

$$H_H(s) = a_{SAFC}(1/b)_{SAFC}H_2(s)$$

where $a_{SAFC}$ and $b_{SAFC}$ are two variable gain setting constants and $H_1(s)$, $H_2(s)$ are filter transfer functions.

5. A method according to claim 1 wherein the secondary dynamic compression provides an output voltage defined by:

$$V_{out} = a_{SDC} + b_{SDC} * dB_{in}$$

where the coefficients, $a_{SDC}$ and $b_{SDC}$, are characteristic of the means effecting the compression and the last-said output voltage is provided as a negative feedback signal to the means effecting the primary dynamic compression.

6. A method of signal processing according to claim 5 and further characterized by said time-delayed limiting of compressing of the original signal constituents being altered as a time-varying response function in accordance with the level of signals resulting from said further dynamically compressing of signal constituents.

7. A method of signal processing according to claim 6 and further characterized by bandpass filtering the original signal constituents to define said pass band.

8. A method of signal processing according to claim 7 and further characterized by bandpass filtering the processed signal constituents before recombining them to limit the processed signal constituents to said pass band.

* * * * *

UNITED STATES PATENT AND TRADEMARK OFFICE
CERTIFICATE OF CORRECTION

PATENT NO. : 4,741,039
DATED : April 26, 1988
INVENTOR(S) : Graham P. Bloy

It is certified that error appears in the above-identified patent and that said Letters Patent is hereby corrected as shown below:

Claim 3, column 27, line 40 — The formula "$bB_{out} = a_{PVC} + b_{PVC} * dB_{in}$" should be --$dB_{out} = a_{PVC} + b_{PVC} * dB_{in}$--

Signed and Sealed this

Thirtieth Day of August, 1988

Attest:

DONALD J. QUIGG

*Attesting Officer*   *Commissioner of Patents and Trademarks*